United States Patent
Machida

(10) Patent No.: US 10,455,010 B2
(45) Date of Patent: Oct. 22, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Hiroaki Machida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 71 days.

(21) Appl. No.: 15/598,740

(22) Filed: May 18, 2017

(65) Prior Publication Data

US 2018/0077231 A1 Mar. 15, 2018

(30) Foreign Application Priority Data

Sep. 14, 2016 (JP) ................................. 2016-179783

(51) Int. Cl.
*G06F 15/16* (2006.01)
*H04L 29/08* (2006.01)
(52) U.S. Cl.
CPC ...... *H04L 67/1029* (2013.01); *H04L 67/1008* (2013.01); *H04L 67/1097* (2013.01)

(58) Field of Classification Search
CPC ........................ H04L 67/1029; H04L 67/1008
See application file for complete search history.

(56) References Cited

FOREIGN PATENT DOCUMENTS

JP  2010-113460 A  5/2010

*Primary Examiner* — Hua Fan
(74) *Attorney, Agent, or Firm* — Oliff PLC

(57) ABSTRACT

An information processing apparatus includes a memory, an acquisition unit, a storing unit, and a controller. The memory stores information concerning communication states between plural destination storage locations and plural areas. The acquisition unit acquires information on a request source area in which a user has submitted a request to acquire content among the plural areas. The storing unit stores the content in a destination storage location in response to receipt of the request. The storing unit changes a destination storage location of the content in accordance with a communication state between the request source area and each of the plural destination storage locations. The controller performs control to transmit, to the user, information for accessing a destination storage location in which the content is stored.

9 Claims, 25 Drawing Sheets

| DISTRIBUTION APPARATUS IDENTIFIER | COMMUNICATION PATH (FOR DISTRIBUTION) | DOMAIN INFORMATION ON DISTRIBUTION APPARATUS | IP ADDRESS RANGE FOR DISTRIBUTION APPARATUS | COST | PERFORMANCE | ECOLOGICAL SUSTAINABILITY |
|---|---|---|---|---|---|---|
| DISTRIBUTION APPARATUS A | INTERNET | cdn-a.xxx.co.jp | xxx.xxx.xxx.xxxx/16 | A | A | C |
| DISTRIBUTION APPARATUS B | INTERNET | cdn-b.fujixerox.co.jp | yyy.yyy.yyy.yyy/24 | B | C | A |
| DISTRIBUTION APPARATUS C | INTERNET | cdn-c.xxx.com | zzz.zzz.zzz.zzz/24 | C | A | B |
| DISTRIBUTION APPARATUS D | INTRANET | intranet.xxx.xxx.jp | ... | A | A | A |

FIG. 3

| DISTRIBUTION APPARATUS IDENTIFIER | COMMUNICATION PATH (FOR DISTRIBUTION) |
|---|---|
| DISTRIBUTION APPARATUS A | INTERNET |
| DISTRIBUTION APPARATUS B | INTRANET |

FIG. 4

| CONTENT IDENTIFIER | AVAILABILITY OF INTERNET DISTRIBUTION | AVAILABILITY OF INTRANET DISTRIBUTION |
|---|---|---|
| CONTENT A | AVAILABLE | AVAILABLE |
| CONTENT B | NOT AVAILABLE | AVAILABLE |
| CONTENT C | AVAILABLE | NOT AVAILABLE |

FIG. 5

| CONTENT IDENTIFIER | IDENTIFIER OF CONTENT-ARRANGED DISTRIBUTION APPARATUS | URL |
|---|---|---|
| CONTENT A | DISTRIBUTION APPARATUS A | http://(FQDN OF DISTRIBUTION APPARATUS A)/XXXX/XXX |
| CONTENT A | DISTRIBUTION APPARATUS B | http://(FQDN OF DISTRIBUTION APPARATUS B)/XXXX/XXX |
| CONTENT C | DISTRIBUTION APPARATUS A | http://(FQDN OF DISTRIBUTION APPARATUS A)/XXXX/XXX |

FIG. 9

| DISTRIBUTION APPARATUS IDENTIFIER | COMMUNICATION PATH (FOR DISTRIBUTION) | DOMAIN INFORMATION ON DISTRIBUTION APPARATUS | IP ADDRESS RANGE FOR DISTRIBUTION APPARATUS | COST | PERFORMANCE | ECOLOGICAL SUSTAINABILITY |
|---|---|---|---|---|---|---|
| DISTRIBUTION APPARATUS A | INTERNET | cdn-a.xxx.co.jp | xxx.xxx.xxx.xxxx/16 | A | A | C |
| DISTRIBUTION APPARATUS B | INTERNET | cdn-b.fujixerox.co.jp | yyy.yyy.yyy.yyy/24 | B | C | A |
| DISTRIBUTION APPARATUS C | INTERNET | cdn-c.xxx.com | zzz.zzz.zzz.zzz/24 | C | A | B |
| DISTRIBUTION APPARATUS D | INTRANET | intranet.xxx.xxx.jp | ... | A | A | A |

FIG. 10

| USER IDENTIFIER (OR IP ADDRESS) | DOMAIN TO WHICH ACCESS IS ALLOWED | INFORMATION ON IP ADDRESS RANGE FOR DISTRIBUTION APPARATUS TO WHICH ACCESS IS ALLOWED |
|---|---|---|
| USER A | ALLOWED: *.xxx.co.jp | |
| USER B | ALLOWED: *.fujixerox.co.jp | xxx.xxx.xxx.xxxx/16 |
| USER C | NG: *.com | |
| (OTHER USERS) | (OK FOR ALL) | (OK FOR ALL) |

FIG. 11

| USER IDENTIFIER (OR IP ADDRESS) | MEASURE TO BE EMPHASIZED |
|---|---|
| USER A | PERFORMANCE |
| USER B | ECOLOGICAL SUSTAINABILITY |
| USER C | PERFORMANCE |
| (OTHER USERS) | (COST) |

FIG. 14

| DISTRIBUTION APPARATUS IDENTIFIER | COMMUNICATION PATH (FOR DISTRIBUTION) | COST | GEOGRAPHIC RESTRICTIONS FOR CONTENT DISTRIBUTION | OTHER ATTRIBUTES |
|---|---|---|---|---|
| DISTRIBUTION APPARATUS A | INTERNET | A (DEFAULT) | NOT DISTRIBUTED TO COUNTRY X | ... |
| DISTRIBUTION APPARATUS B | INTERNET | B | | ... |
| DISTRIBUTION APPARATUS C | INTERNET | C | | ... |
| DISTRIBUTION APPARATUS D | INTRANET | A | | ... |

FIG. 16

| CONTENT IDENTIFIER | AVAILABILITY OF INTERNET DISTRIBUTION | AVAILABILITY OF INTRANET DISTRIBUTION | CONDITIONS FOR INTERNET DISTRIBUTION | RESTRICTIONS |
|---|---|---|---|---|
| CONTENT A | AVAILABLE | AVAILABLE | AUTHENTICATED USERS ONLY | ENCRYPTED WITH PUBLIC KEY OF USER |
| CONTENT B | AVAILABLE | AVAILABLE | ACCESS SOURCE IP ADDRESS RANGE OF CLIENT: xxx.xxx.xxx/16 | EXPIRE IN 24 HOURS |
| CONTENT C | AVAILABLE | AVAILABLE | SPECIFIC AUTHENTICATED USERS ONLY | EXPIRE IN 1 HOUR |

FIG. 17

| CONTENT IDENTIFIER | USER IDENTIFIER |
|---|---|
| CONTENT C | USER A |
| CONTENT C | USER X |
| CONTENT C | USER Y |

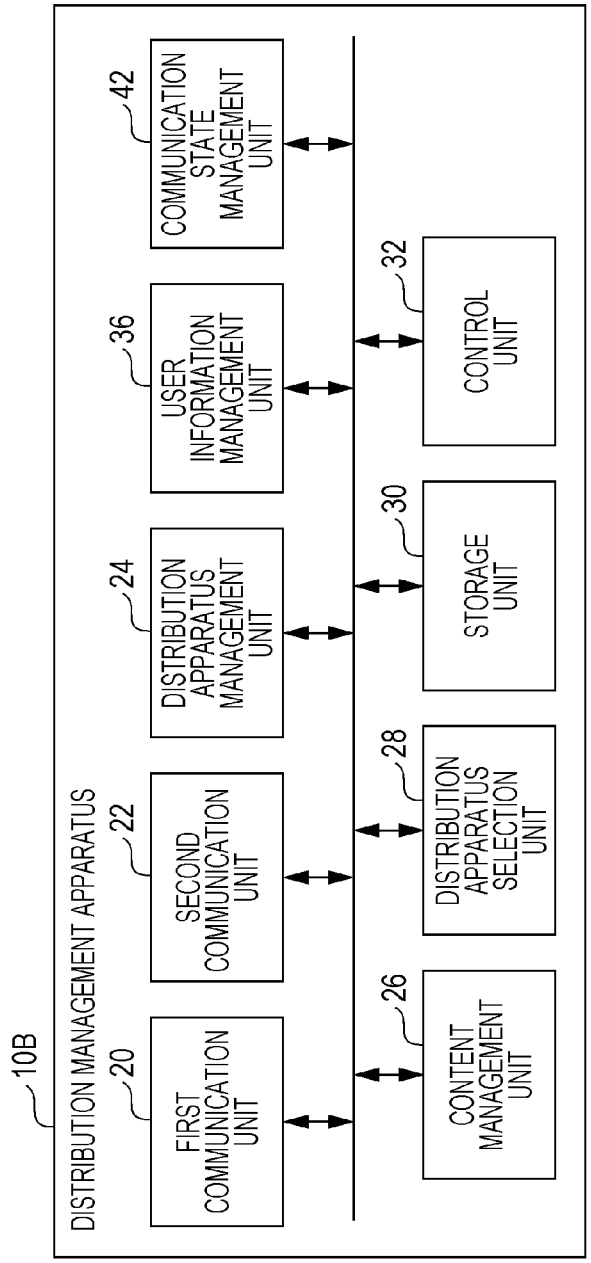

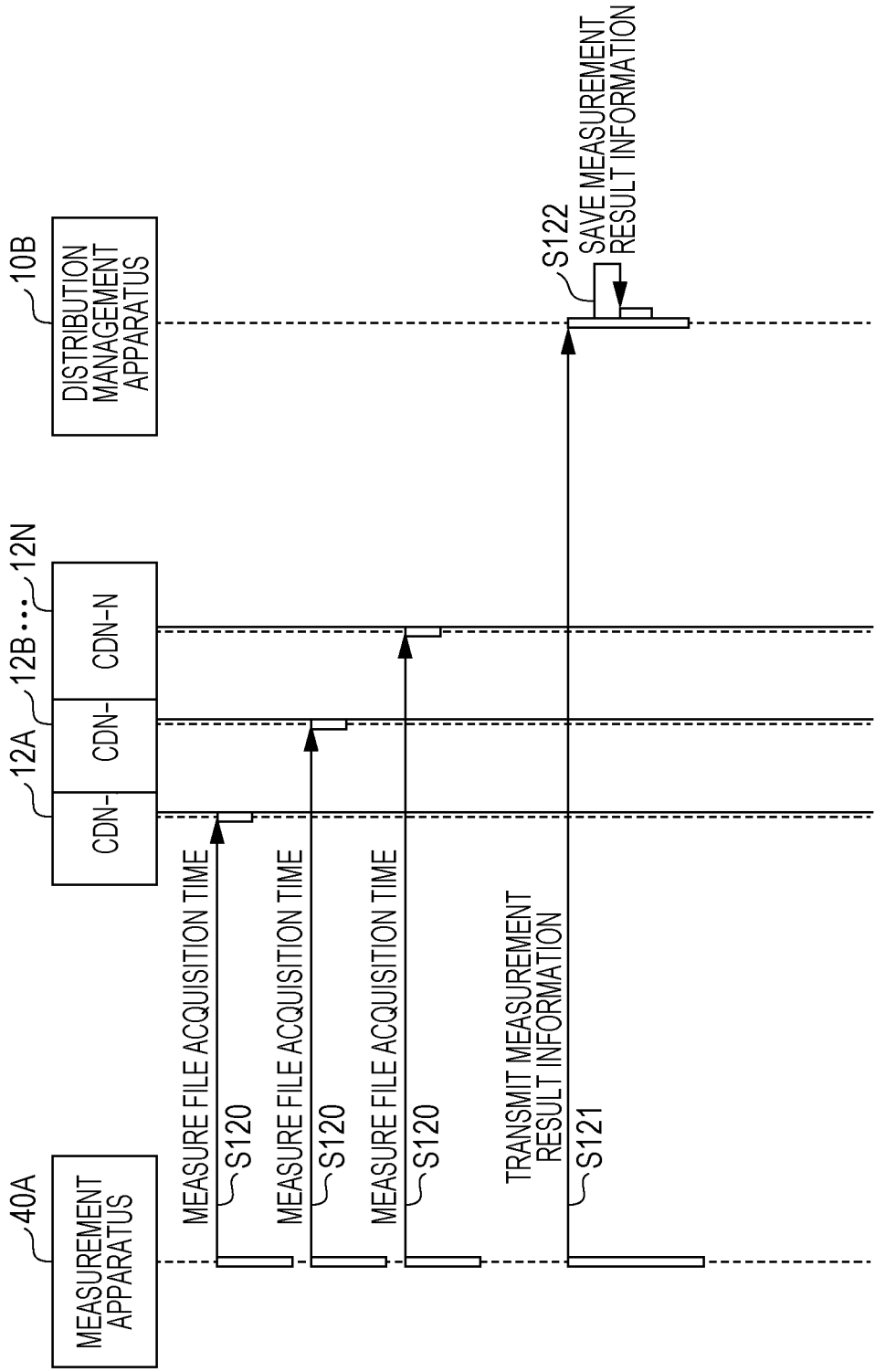

FIG. 24

| MEASUREMENT AREA | CORRESPONDING IP AREA |
|---|---|
| TOKYO | xxx.xxx.xxx.xxx/16, ... |
| HONG KONG | yyy.xxx.xxx.xxx/16, ... |
| SINGAPORE | zzz.xxx.xxx.xxx/16, ... |
| BEIJING | aaa.xxx.xxx.xxx/16, ... |
| SHANGHAI | bbb.xxx.xxx.xxx/16, ... |
| ... | ... |

FIG. 25

| MEASUREMENT TARGET CDN | MEASUREMENT AREA | DATE OF MEASUREMENT | MEASUREMENT INFORMATION (AVERAGE DOWNLOAD TIME) | MEASUREMENT INFORMATION (DOWNLOAD FAILURE RATE) |
|---|---|---|---|---|
| CDN-A | TOKYO | 2016/01/01 | 500 msec | 0 |
| CDN-B | TOKYO | 2016/01/01 | 300 msec | 0 |
| CDN-C | TOKYO | 2016/01/01 | 300 msec | 0 |
| CDN-A | BEIJING | 2016/01/01 | 13000 msec | 0 |
| CDN-B | BEIJING | 2016/01/01 | 2800 msec | 0 |
| CDN-C | BEIJING | 2016/01/01 | 10000 msec | 0.3 |
| CDN-A | BEIJING | 2016/01/02 | 8000 msec | 0 |
| CDN-B | BEIJING | 2016/01/02 | 10000 msec | 0.1 |
| CDN-C | BEIJING | 2016/01/02 | 12000 msec | 0 |
| ... | ... | ... | ... | ... |

FIG. 27

| CONTENT IDENTIFIER | AVAILABILITY OF INTERNET DISTRIBUTION | AVAILABILITY OF INTRANET DISTRIBUTION | MEASUREMENT TARGET | SELECTION CRITERIA | OTHER ATTRIBUTES |
|---|---|---|---|---|---|
| CONTENT A | AVAILABLE | AVAILABLE | NO | | ... |
| CONTENT B | AVAILABLE | AVAILABLE | YES | · WITHIN FIVE MINUTES<br>· LESS THAN FAILURE RATE OF 0.1% | ... |
| CONTENT C | AVAILABLE | AVAILABLE | NO | | ... |

FIG. 28

| MEASUREMENT URL |
|---|
| https://cdn-A/test/fileA |
| https://cdn-B/test/fileA |
| https://cdn-C/test/fileA |
| https://cdn-A/app/fileB |
| https://cdn-B/app/fileB |
| https://cdn-C/app/fileB |
| ... |

URL FOR ACQUIRING FILE A FROM CDNs

URL FOR ACQUIRING FILE B FROM CDNs

FIG. 31

| MEASUREMENT TARGET CDN | MEASUREMENT AREA | DATE OF MEASUREMENT | MEASUREMENT INFORMATION (AVERAGE DOWNLOAD TIME) | MEASUREMENT INFORMATION (DOWNLOAD FAILURE RATE) |
|---|---|---|---|---|
| CDN-A | TOKYO | 2016/01/01 | 500 msec | 0 |
| CDN-B | TOKYO | 2016/01/01 | 300 msec | 0 |
| CDN-C | TOKYO | 2016/01/01 | 300 msec | 0 |
| CDN-A | BEIJING | 2016/01/01 | 13000 msec | 0 |
| CDN-B | BEIJING | 2016/01/01 | 2800 msec | 0 |
| CDN-C | BEIJING | 2016/01/01 | 10000 msec | 0.3 |
| CDN-A | BEIJING | 2016/01/02 | 8000 msec | 0 |
| CDN-B | BEIJING | 2016/01/02 | 10000 msec | 0.1 |
| CDN-C | BEIJING | 2016/01/02 | 12000 msec | 0 |
| ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-179783 filed Sep. 14, 2016.

BACKGROUND

(i) Technical Field

The present invention relates to an information processing apparatus and a non-transitory computer readable medium.

(ii) Related Art

In a content distribution system, typically, content to be distributed is stored in a certain destination storage location in advance, and a user at a destination distribution location to which the content will be distributed submits a request to the destination storage location to acquire the content.

In some cases, the communication state between the destination storage location of content and the destination distribution location of the content (e.g., the area in which a user submitted a request to acquire the content) may change depending on factors such as the positional relationship between the destination storage location and the destination distribution location (e.g., the geographical conditions of the destination storage location and the destination distribution location) or the time slot within which the destination storage location is accessed.

SUMMARY

According to an aspect of the invention, there is provided an information processing apparatus including a memory, an acquisition unit, a storing unit, and a controller. The memory stores information concerning communication states between plural destination storage locations and plural areas. The acquisition unit acquires information on a request source area in which a user has submitted a request to acquire content among the plural areas. The storing unit stores the content in a destination storage location in response to receipt of the request. The storing unit changes a destination storage location of the content in accordance with a communication state between the request source area and each of the plural destination storage locations. The controller performs control to transmit, to the user, information for accessing a destination storage location in which the content is stored.

BRIEF DESCRIPTION OF THE DRAWINGS

Exemplary embodiments of the present invention will be described in detail based on the following figures, wherein:

FIG. 3 is a diagram illustrating an example of a distribution apparatus management table;

FIG. 4 is a diagram illustrating an example of a content management table;

FIG. 5 is a diagram illustrating an example of a content arrangement location management table;

FIG. 9 is a diagram illustrating an example of a distribution apparatus management table;

FIG. 10 is a diagram illustrating an example of an access restriction management table;

FIG. 11 is a diagram illustrating an example of a user interest management table;

FIG. 14 is a diagram illustrating an example of a distribution apparatus management table;

FIG. 16 is a diagram illustrating an example of a content management table;

FIG. 17 is a diagram illustrating an example of an access-allowed user management table;

FIG. 21 is a block diagram illustrating a distribution management apparatus according to the sixth exemplary embodiment;

FIG. 22 is a diagram illustrating an example of measurement URL information;

FIG. 23 is a sequence diagram illustrating an operation for measuring a communication state;

FIG. 24 is a diagram illustrating an example of a measurement area management table;

FIG. 25 is a diagram illustrating an example of a communication state management table;

FIG. 27 is a diagram illustrating an example of a content management table;

FIG. 28 is a diagram illustrating an example of measurement URL information;

FIG. 31 is a diagram illustrating an example of a communication state management table.

DETAILED DESCRIPTION

First Exemplary Embodiment

Figure 1:
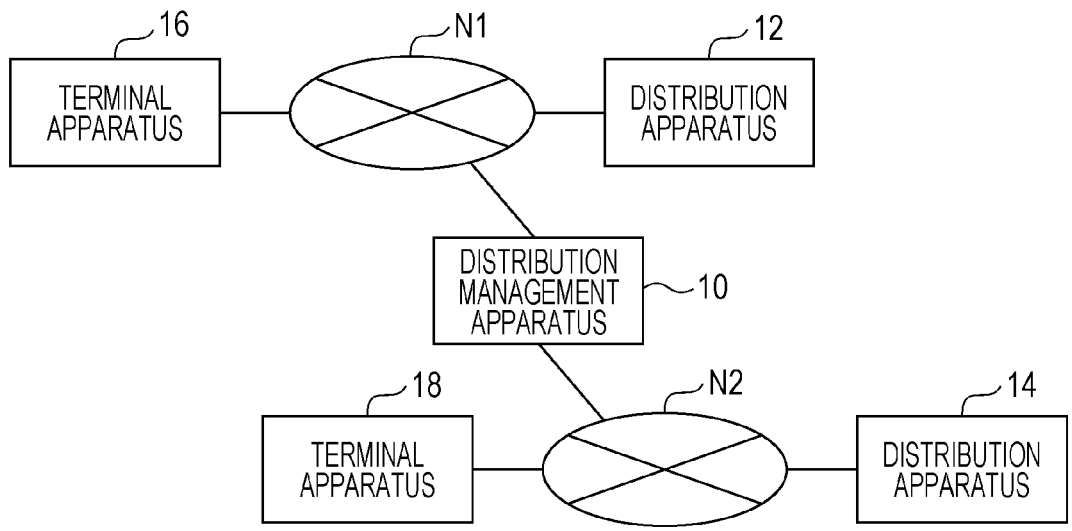
FIG. 1 is a block diagram illustrating a content distribution system according to a first exemplary embodiment of the present invention.

FIG. 1 illustrates an example of a content distribution system that is an information processing system according to a first exemplary embodiment of the present invention. The content distribution system includes a distribution management apparatus 10 and one or more distribution apparatuses (distribution apparatuses 12 and 14, for example). The distribution management apparatus 10 serves as an information processing apparatus, and each distribution apparatus serves as a destination storage location. The distribution management apparatus 10, the distribution apparatus 12, and one or more terminal apparatuses 16 each have a function of communicating with another apparatus via a communication path N1. The communication path N1 is the Internet, by way of example. The distribution management apparatus 10, the distribution apparatus 14, and one or more terminal apparatuses 18 each have a function of communicating with another apparatus via a communication path N2. The communication path N2 is an intranet, by way of example. The content distribution system may include multiple distribution apparatuses 12 and multiple distribution apparatuses 14.

The distribution management apparatus 10 has a function of storing content intended for distribution in a specific distribution apparatus in accordance with conditions concerning the content, the user at the destination distribution location, and so on.

The distribution apparatus 12 has a function of storing data of content and distributing the content to a terminal apparatus at a destination distribution location via the Internet. That is, the distribution apparatus 12 may be a distribution apparatus intended for an Internet user. For example, the distribution apparatus 12 distributes the content by using a content delivery network (CDN).

The distribution apparatus 14 has a function of storing data of content and distributing the content to a terminal apparatus at a destination distribution location via an intranet. For example, when the communication path N2 is an in-house network, the distribution apparatus 14 may be a distribution apparatus intended for an in-house user.

Each of the terminal apparatuses 16 and 18 is an apparatus such as a personal computer (PC), a tablet PC, a smartphone, or a mobile phone and has a function of transmitting and receiving data to and from another apparatus.

In the content distribution system, content to be distributed is provided from a provider to the distribution management apparatus 10, and the distribution management apparatus 10 stores the content in a specific distribution apparatus. The specific distribution apparatus distributes the content to a user (terminal apparatus) at a destination distribution location.

Figure 2:
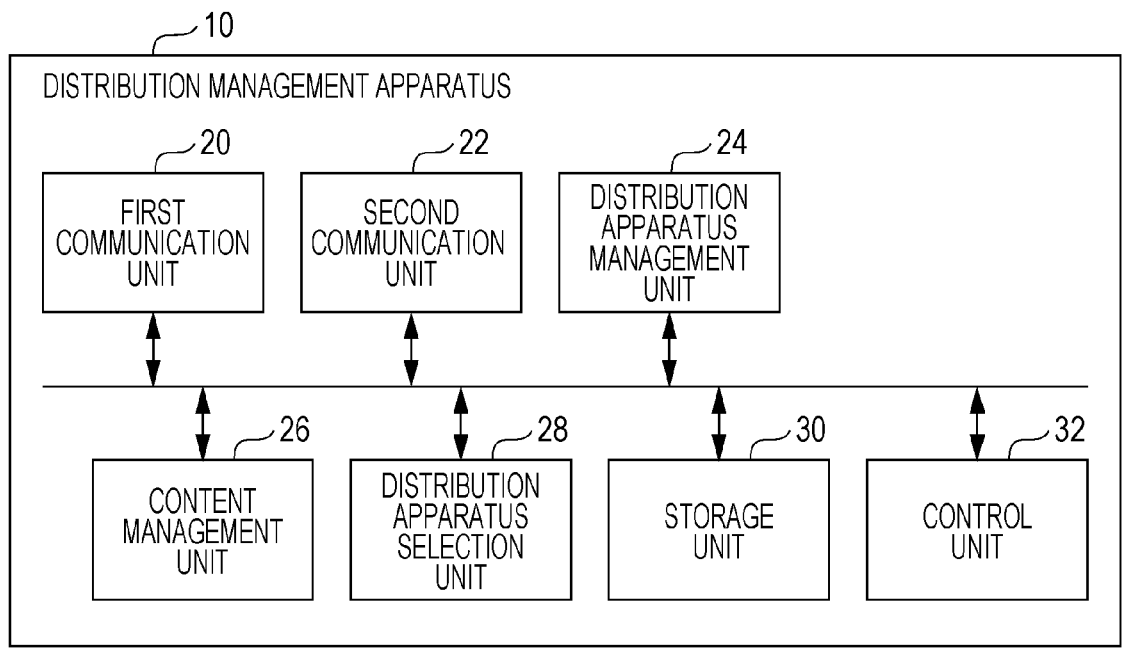
FIG. 2 is a block diagram illustrating a distribution management apparatus according to the first exemplary embodiment.

The configuration of the distribution management apparatus 10 will be described in detail with reference to FIG. 2. FIG. 2 illustrates the configuration of the distribution management apparatus 10 according to the first exemplary embodiment.

A first communication unit 20 is a communication interface and has a function of transmitting and receiving data to and from another apparatus via the communication path N1 (the Internet).

A second communication unit 22 is a communication interface and has a function of transmitting and receiving data to and from another apparatus via the communication path N2 (an intranet).

A distribution apparatus management unit 24 holds distribution apparatus attribute information indicating the attributes of individual distribution apparatuses to manage the distribution apparatuses. The distribution apparatus attribute information is, for example, information indicating communication paths supported by the individual distribution apparatuses. Specifically, the distribution apparatus attribute information is information indicating that each distribution apparatus is an apparatus intended for Internet distribution or an apparatus intended for intranet distribution. For example, each time a new distribution apparatus is registered in the content distribution system, the distribution apparatus management unit 24 holds attribute information on the new distribution apparatus.

A content management unit 26 holds content attribute information indicating the attribute of content to be distributed and content arrangement information indicating a location (destination storage location) in which the content is arranged to manage content. For example, the content attribute information is information indicating that the content is content intended for Internet distribution or content intended for intranet distribution. For example, each time new content is registered in the distribution management apparatus 10, the content management unit 26 holds attribute information on the content. The content arrangement information is information indicating the destination storage location of the content and is information such as an identifier for identifying a distribution apparatus or a uniform resource locator (URL) of the distribution apparatus. For example, each time content is arranged (stored) in a distribution apparatus, content arrangement information regarding the content is created and held in the content management unit 26.

A distribution apparatus selection unit 28 has a function of storing content to be distributed in a specific distribution apparatus on the basis of the distribution apparatus attribute information and the content attribute information. For example, when a terminal apparatus at a destination distribution location accesses the distribution management apparatus 10 via the Internet, the distribution apparatus selection unit 28 stores the content to be distributed in the distribution apparatus 12, which is intended for Internet distribution. When a terminal apparatus at a destination distribution location accesses the distribution management apparatus 10 via an intranet, the distribution apparatus selection unit 28 stores the content to be distributed in the distribution apparatus 14, which is intended for intranet distribution. In another example, when the content to be distributed is content intended for Internet distribution, the distribution apparatus selection unit 28 may store the content to be distributed in the distribution apparatus 12. When the content to be distributed is content intended for intranet distribution, the distribution apparatus selection unit 28 may store the content to be distributed in the distribution apparatus 14.

A storage unit 30 is a storage device such as a hard disk or a memory. The storage unit 30 stores data of content provided from a content provider, for example.

A control unit 32 controls the operation of the individual units of the distribution management apparatus 10.

FIG. 3 illustrates an example of a distribution apparatus management table. The distribution apparatus management table corresponds to an example of distribution apparatus attribute information and is information stored in the distribution apparatus management unit 24. In the distribution apparatus management table, a distribution apparatus identifier for identifying a distribution apparatus and information indicating a communication path (for Internet distribution or intranet distribution) that the distribution apparatus supports are associated with each other. In the distribution apparatus management table, "distribution apparatus A" is an apparatus for use in Internet distribution and corresponds to the distribution apparatus 12, for example, and "distribution apparatus B" is an apparatus for use in intranet distribution and corresponds to the distribution apparatus 14, for example. Each time a new distribution apparatus is registered in the content distribution system, information on the new distribution apparatus is added to the distribution apparatus management table.

FIG. 4 illustrates an example of a content management table. The content management table is an example of content attribute information and is information stored in the content management unit 26. In the content management table, a content identifier for identifying content and information indicating a communication path available for the content are associated with each other. For example, "content A" is available for both Internet distribution and intranet distribution. In contrast, "content B" is available for intranet distribution, but is not available for Internet distribution. "Content C" is available for Internet distribution, but is not available for intranet distribution. A communication path available for each item of content is determined by the corresponding content provider, for example. A communication path available for each item of content may be determined by the administrator or the like of the content distribution system. For example, each time new content is registered in the distribution management apparatus 10, attribute information on the content is added to the content management table.

FIG. 5 illustrates an example of a content arrangement location management table. The content arrangement location management table is an example of content arrangement information and is information stored in the content management unit 26. In the content arrangement location management table, a content identifier for identifying content, a distribution apparatus identifier for identifying a distribution apparatus in which the content is arranged (stored), and a URL indicating the location (destination storage location) in which the content is arranged are associated with one another. For example, the "content A" is stored in both the distribution apparatus A and the distribution apparatus B. For example, each time content is arranged (deployed) in a distribution apparatus, information indicating a location (destination storage location) in which the content is arranged is added to the content arrangement location management table.

Figure 6:
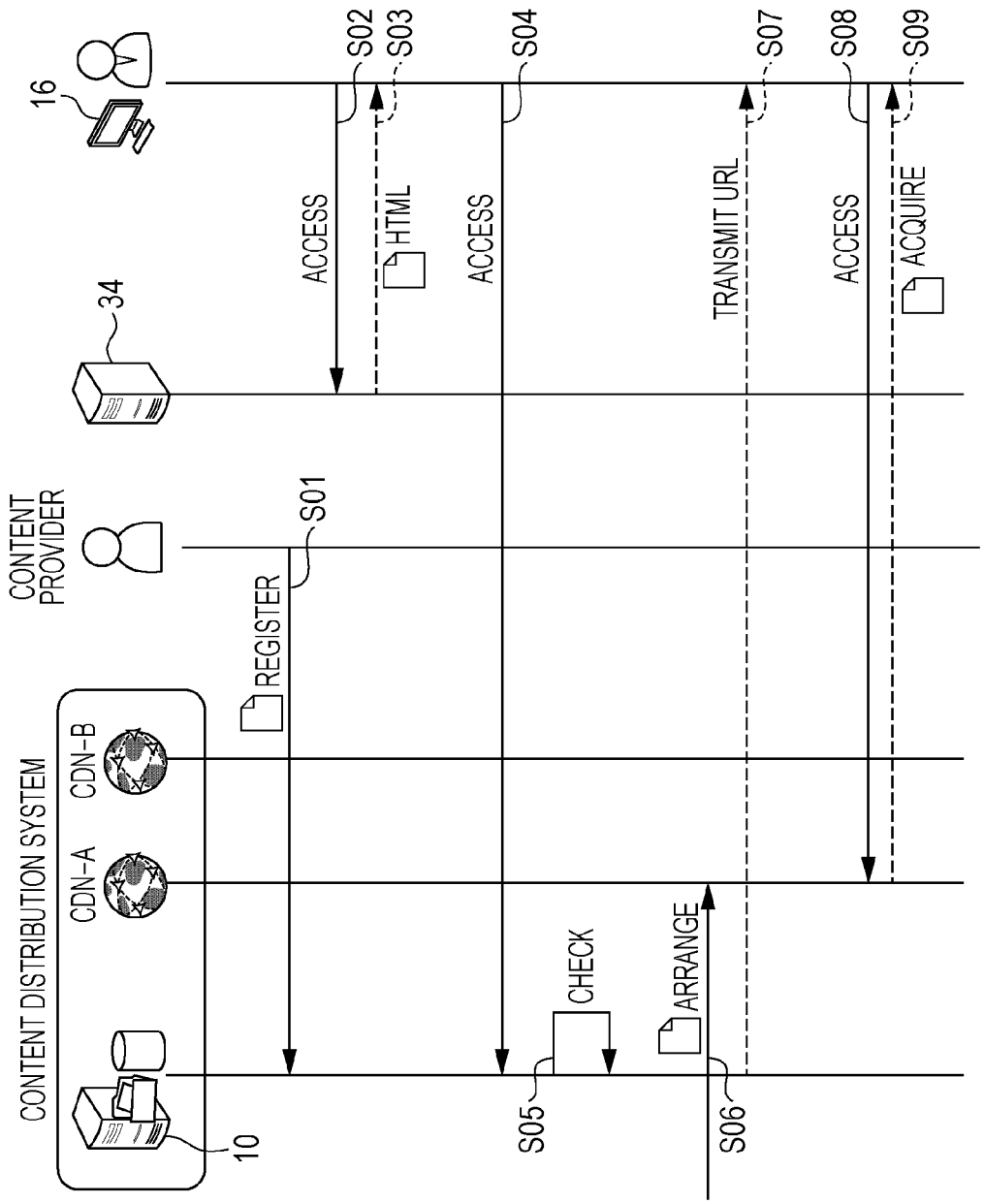
FIG. 6 is a sequence diagram illustrating an overview of a process according to the first exemplary embodiment.

A process performed by the content distribution system according to the first exemplary embodiment will now be described. FIG. 6 is a sequence diagram illustrating an overview of the process.

First, a content provider uses an apparatus such as a terminal apparatus to send content intended for distribution to the distribution management apparatus 10 to register the content (S01). The content is stored in the storage unit 30. For example, content that forms a website (e.g., content written in JavaScript (registered trademark) or the like) is registered. In addition to the content, content attribute information is sent to and registered in the distribution management apparatus 10. For example, the content provider determines the details of the content attribute information. For content to be distributed via the Internet, content attribute information includes information indicating that the content is available for Internet distribution. For content to be distributed via an intranet, content attribute information includes information indicating that the content is available for intranet distribution. When new content is sent to the distribution management apparatus 10, the content management unit 26 adds attribute information on the content to the content management table.

Then, a user of the content (i.e., a user at a destination distribution location) uses a terminal apparatus to access, for example, a business web server 34 (S02). The access is implemented by a web browser, for example. For instance, a terminal apparatus 16 is used here. The business web server 34 dynamically creates a Hypertext Markup Language (HTML) file and sends the created HTML file to a web browser on the terminal apparatus 16 (S03). The HTML file contains the URL of the distribution management apparatus 10 as the URL from which the content written in JavaScript or the like is acquired. The HTML file further includes a content identifier for identifying the content to be distributed.

Then, the web browser on the terminal apparatus 16 accesses the URL contained in the HTML file (S04). As described above, the URL is the URL of the distribution management apparatus 10. Thus, the access from the terminal apparatus 16 to the distribution management apparatus 10 is implemented. At this time, the content identifier of the content to be distributed is sent from the terminal apparatus 16 to the distribution management apparatus 10.

In the distribution management apparatus 10, the distribution apparatus selection unit 28 checks management information (the distribution apparatus management table and the content management table) (S05) and arranges (stores) the content to be distributed (the content having the content identifier which has been sent from the terminal apparatus 16) in a specific distribution apparatus in accordance with conditions concerning the content to be distributed or the user (S06). For example, the content distribution system is assumed to include CDN-A and CDN-B which serve as distribution apparatuses. Each of the CDN-A and the CDN-B is assumed to have a function of distributing content via the Internet, by way of example. It is assumed that the CDN-A is a default CDN (distribution apparatus) and that the terminal apparatus 16 has a function of receiving content distributed from the CDN-A. In this case, the content to be distributed is arranged (stored) in the default CDN-A. When the content to be distributed is arranged in the CDN-A, the content management unit 26 adds content arrangement information concerning the content to the content arrangement location management table. Then, the URL indicating the location in which the content is arranged is sent from the distribution management apparatus 10 to the terminal apparatus 16 (S07). The URL is information indicating a storage location on the CDN-A in which the content to be distributed is stored. If the content to be distributed has already been arranged in the CDN-A, the arrangement process in step S06 is not necessary.

Then, the web browser on the terminal apparatus 16 accesses the URL sent from the distribution management apparatus 10 (S08). Since the URL indicates the storage location on the CDN-A, the access from the terminal apparatus 16 to the CDN-A is implemented. Then, the web browser acquires the content to be distributed from the storage location indicated by the URL (S09).

Figure 7:
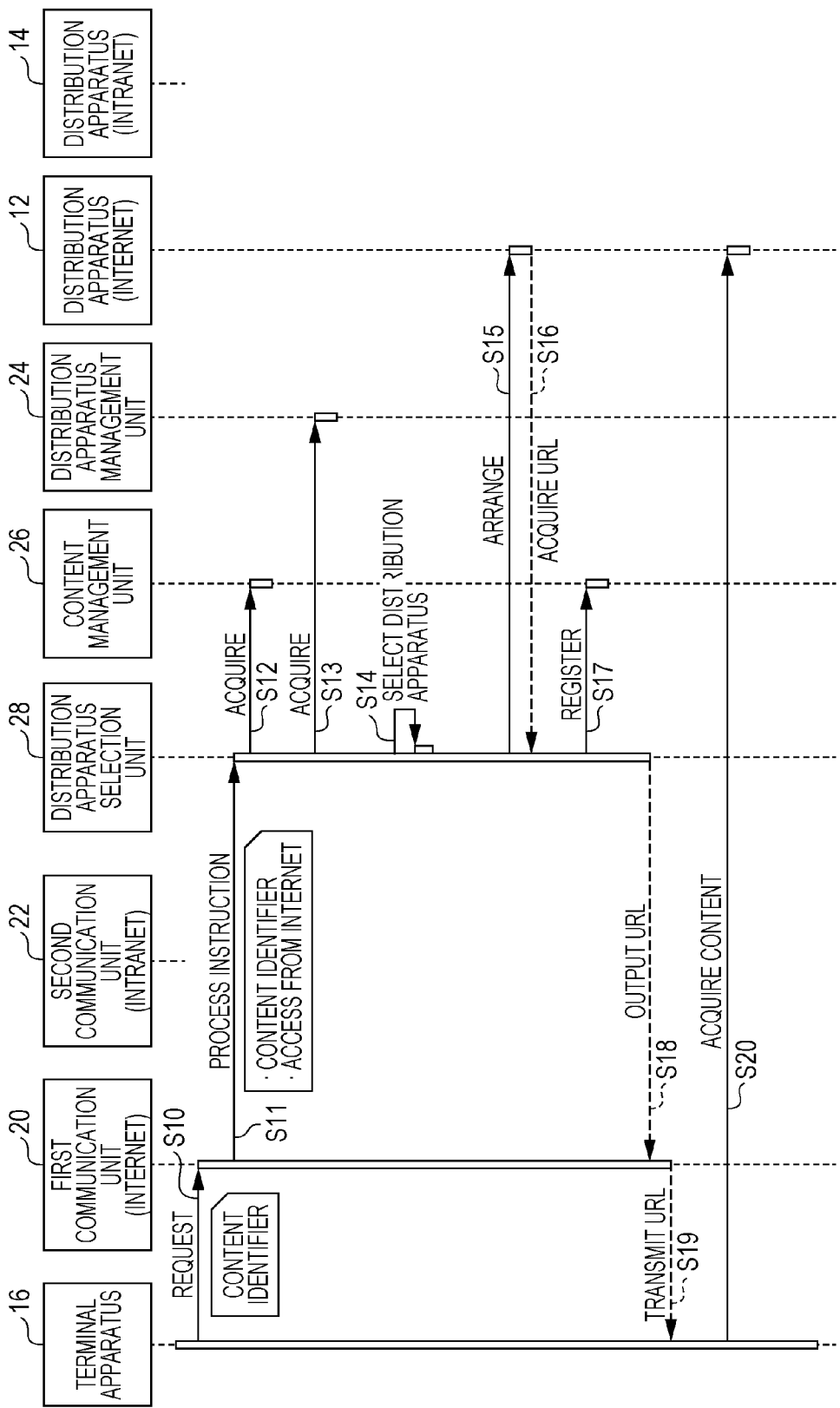
FIG. 7 is a sequence diagram illustrating the details of the process according to the first exemplary embodiment.

The process performed by the content distribution system according to the first exemplary embodiment will be described in detail hereinafter. FIG. 7 is a sequence diagram illustrating the details of the process. The processing after step S04 illustrated in FIG. 6 will be described here. That is, it is assumed that the content to be distributed has been registered in the distribution management apparatus 10 and has been stored in the storage unit 30. It is also assumed that a terminal apparatus 16 is used by the user at the destination distribution location.

First, the terminal apparatus 16 accesses the distribution management apparatus 10 via the communication path N1, which is the Internet, and sends to the distribution management apparatus 10 information indicating a request for acquiring content intended for distribution (S10). The information indicating the request includes the content identifier of the content to be distributed.

In the distribution management apparatus 10, the first communication unit 20 accepts the information indicating the request and, upon acceptance of the information, provides a process instruction to the distribution apparatus selection unit 28 (S11). That is, the function of selecting a distribution apparatus is invoked, and, subsequently, the distribution apparatus selection unit 28 performs a process. The process instruction (invocation instruction) includes the content identifier and access information indicating that the terminal apparatus 16 has made access via the Internet.

The distribution apparatus selection unit 28 acquires content attribute information on the content intended for distribution from the content management table stored in the content management unit 26 by using the content identifier as a search key (S12). By referring to the content attribute information, the communication path (for Internet distribution or intranet distribution) available for the content to be distributed is identified.

The distribution apparatus selection unit 28 further acquires distribution apparatus attribute information from the distribution apparatus management table stored in the distribution apparatus management unit 24 (S13). By referring to the distribution apparatus attribute information, the communication paths (for Internet distribution or intranet distribution) supported by individual distribution apparatuses are identified.

Then, the distribution apparatus selection unit 28 refers to the content attribute information and the distribution apparatus attribute information to select a distribution apparatus suitable for the delivery of the content intended for distribution to the terminal apparatus 16 (S14).

For instance, the content intended for distribution is assumed to be the "content A". With reference to the content management table illustrated in FIG. 4, the "content A" is available for both Internet distribution and intranet distribution. Thus, the "content A" is available for the delivery to the terminal apparatus 16, which has made access via the Internet. In this case, the delivery of the "content A" to the terminal apparatus 16 is allowed. With reference to the distribution apparatus management table illustrated in FIG. 3, the "distribution apparatus A" (e.g., the distribution apparatus 12) supports Internet distribution. In this case, the "distribution apparatus A" is selected as the location (destination storage location) in which the "content A" is arranged.

When the content to be distributed is not available for Internet distribution, such as the "content B", the delivery of the content (e.g., the "content B") to the terminal apparatus 16 is prohibited. When no distribution apparatus supporting Internet distribution has been registered in the content distribution system, the delivery of the content to the terminal apparatus 16 is prohibited. In the cases described above, information indicating that the delivery of the content intended for distribution is prohibited is sent from the distribution management apparatus 10 to the terminal apparatus 16 and is displayed.

In the following description, the content intended for distribution is the "content A" and the "distribution apparatus A" has been selected as the location (destination storage location) in which the "content A" is arranged.

If the "content A" has not been arranged (stored) in the "distribution apparatus A" (e.g., the distribution apparatus 12), the distribution apparatus selection unit 28 sends the "content A" to the "distribution apparatus A" to store the "content A" in the "distribution apparatus A" (S15). Then, the distribution apparatus selection unit 28 acquires from the "distribution apparatus A" the URL indicating the destination storage location of the "content A" on the "distribution apparatus A" (S16). The URL is registered in the content arrangement location management table in the content management unit 26 (S17). Accordingly, the state of the arrangement of the "content A" is managed in the content arrangement location management table.

Then, the distribution apparatus selection unit 28 outputs the URL indicating the destination storage location of the "content A" (S18). The URL is transmitted to the terminal apparatus 16 by the first communication unit 20 (S19). The terminal apparatus 16 accesses the "distribution apparatus A" having the storage location indicated by the URL and acquires the "content A" from the "distribution apparatus A" (S20).

As described above, according to the first exemplary embodiment, content to be distributed is arranged (stored) in a specific distribution apparatus in accordance with the communication environment of a content user (a terminal apparatus at a destination distribution location) (in accordance with the communication path used by the terminal apparatus) so that the content is distributed to the terminal apparatus at the destination distribution location. That is, the content to be distributed is arranged in a distribution apparatus that the terminal apparatus is allowed to access. This may eliminate the need for the content provider, the administrator, or any other person or entity to manually select a distribution apparatus suitable for the distribution of the content while taking into account a distribution apparatus that the content user is allowed to access. For example, if the content provider, the administrator, or any other person or entity does not know a distribution apparatus that the content user is allowed to access, the content is arranged in a distribution apparatus suitable for the distribution of the content. In addition, the content is arranged in a distribution apparatus suitable for the attribute of the content. Accordingly, the content is provided to the terminal apparatus at the destination distribution location via the communication path suitable for the content.

Second Exemplary Embodiment

Figure 8:
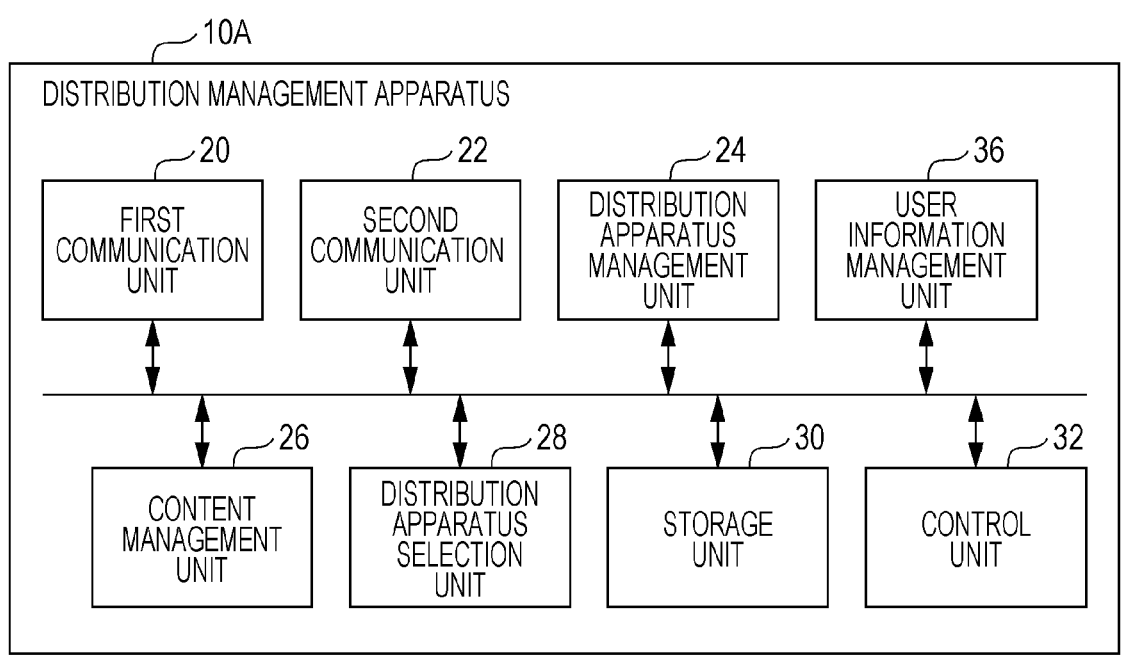
FIG. 8 is a block diagram illustrating a distribution management apparatus according to a second exemplary embodiment.

A content distribution system according to a second exemplary embodiment will be described. FIG. 8 illustrates an example of a distribution management apparatus according to the second exemplary embodiment. The content distribution system according to the second exemplary embodiment includes a distribution management apparatus 10A instead of the distribution management apparatus 10 illustrated in FIG. 2. In the second exemplary embodiment, a distribution apparatus is selected by taking into account access restrictions for a content user (a user at a destination distribution location) or the user's interest. The configuration of the distribution management apparatus 10A will be described hereinafter.

A first communication unit 20 and a second communication unit 22 respectively have the same or substantially the same functions as the first communication unit 20 and the second communication unit 22 according to the first exemplary embodiment.

A distribution apparatus management unit 24 holds distribution apparatus attribute information indicating the attributes of individual distribution apparatuses to manage the distribution apparatuses. In the second exemplary embodiment, the distribution apparatus attribute information includes, for example, information indicating communication paths supported by the distribution apparatuses, information indicating communication ranges for the distribution apparatuses, measure information indicating measures for the distribution apparatuses, and other information. For example, each time a new distribution apparatus is registered in the content distribution system, the distribution apparatus management unit 24 holds attribute information on the new distribution apparatus. Examples of information indicating a communication range corresponding to an individual distribution apparatus include domain information indicating the domain of the distribution apparatus, and information indicating the IP address range for the distribution apparatus. The measure information on an individual distribution apparatus is information indicating the cost, performance, ecological sustainability, and so on of the distribution apparatus.

A content management unit 26 has the same or substantially the same function as the content management unit 26 according to the first exemplary embodiment.

A user information management unit 36 holds access restriction information on access restrictions for each user and user interest information to manage information on the individual users. The access restriction information includes, for example, domain information indicating a domain that a user at a destination distribution location (a terminal apparatus at the destination distribution location) is allowed to access, and information indicating the IP address range that the user at the destination distribution location is allowed to access. The user interest information is information indicating measures on which the user places emphasis for distribution apparatuses. The measures include cost, performance, and ecological sustainability, as described above.

A distribution apparatus selection unit 28 has a function of storing content to be distributed in a specific distribution apparatus on the basis of the distribution apparatus attribute information, the content attribute information, the access restriction information, and the user interest information. The distribution apparatus selection unit 28 arranges (stores) the content to be distributed in, for example, a distribution apparatus included in the domain or IP address range that the terminal apparatus at the destination distribution location is allowed to access, the distribution apparatus being a distribution apparatus whose measures match the measures on which the user places emphasis.

A storage unit 30 and a control unit 32 respectively have the same or substantially the same functions as the storage unit 30 and the control unit 32 according to the first exemplary embodiment.

FIG. 9 illustrates an example of a distribution apparatus management table. The distribution apparatus management table corresponds to an example of distribution apparatus attribute information and is information stored in the distribution apparatus management unit 24. In the distribution apparatus management table, for each distribution apparatus, a distribution apparatus identifier for identifying the distribution apparatus, information indicating a communication path (for Internet distribution or intranet distribution) supported by the distribution apparatus, domain information indicating the domain of the distribution apparatus, information indicating the IP address range for the distribution apparatus, information indicating the cost of the distribution apparatus, information indicating the performance of the distribution apparatus, and information indicating the ecological sustainability of the distribution apparatus are associated with one another. Each time a new distribution apparatus is registered in the content distribution system, information concerning the distribution apparatus is added to the distribution apparatus management table.

In the distribution apparatus management table, for example, "distribution apparatus A" is an apparatus that supports Internet distribution. The domain of the "distribution apparatus A" is "cdn-a.xxx.co.jp", and the IP address range for the "distribution apparatus A" is "xxx.xxx.xxx.xxxx/16". The level of the "cost" of the "distribution apparatus A" is "A", the level of the "performance" of the "distribution apparatus A" is "A", and the level of the "ecological sustainability" of the "distribution apparatus A" is "C". For example, level A is a high level, level B is an intermediate level, and level C is a low level.

The "cost" of a distribution apparatus is a cost required to use the distribution apparatus. The level of the "cost" is determined on the basis of a predetermined fee standard, for example. As to the "cost", level A indicates low cost, level B indicates intermediate cost, and level C indicates high cost. For example, the "cost" of the "distribution apparatus A" is in level A. Thus, the cost required to use the "distribution apparatus A" is set low.

The "performance" of a distribution apparatus is the performance (such as the communication speed) of the distribution apparatus. The level of the "performance" is determined on the basis of a predetermined performance standard, for example. As to the "performance", level A indicates high performance, level B indicates intermediate performance, and level C indicates low performance. For example, the "performances" of the "distribution apparatus A", "distribution apparatus C, and "distribution apparatus D" are in level A. Thus, the performances of the "distribution apparatus A", the "distribution apparatus C, and the "distribution apparatus D" are set high.

The "ecological sustainability" is a measure determined on the basis of a predetermined environment standard or the like, for example, and is, for example, a measure regarding $CO_2$ emissions per unit power generated, power saving performance, or the like. As to the "ecological sustainability", level A indicates high environmental performance (e.g., low $CO_2$ emissions), level B indicates intermediate environmental performance, and level C indicates low environmental performance.

FIG. 10 illustrates an example of an access restriction management table. The access restriction management table is an example of access restriction information and is stored in the user information management unit 36. In the access restriction management table, for each user or each terminal apparatus, a user identifier for identifying the user or the IP address of the terminal apparatus, information indicating the domain that the user or the terminal apparatus is allowed to access, and information indicating the IP address range that the user or the terminal apparatus is allowed to access are associated with one another. For example, the domain that "user A" is allowed to access is "*.xxx.co.jp". No access restriction is set for IP addresses. The access restriction information may be acquired in advance or may be acquired dynamically.

FIG. 11 illustrates an example of a user interest management table. The user interest management table is an example of user interest information and is stored in the user information management unit 36. In the user interest management table, for each user or each terminal apparatus, a user identifier for identifying the user or the IP address of the terminal apparatus, and information indicating the measure on which the user places emphasis are associated with each other. For example, the measures on which the "user A" and "user C" place emphasis are "performance".

Figure 12:
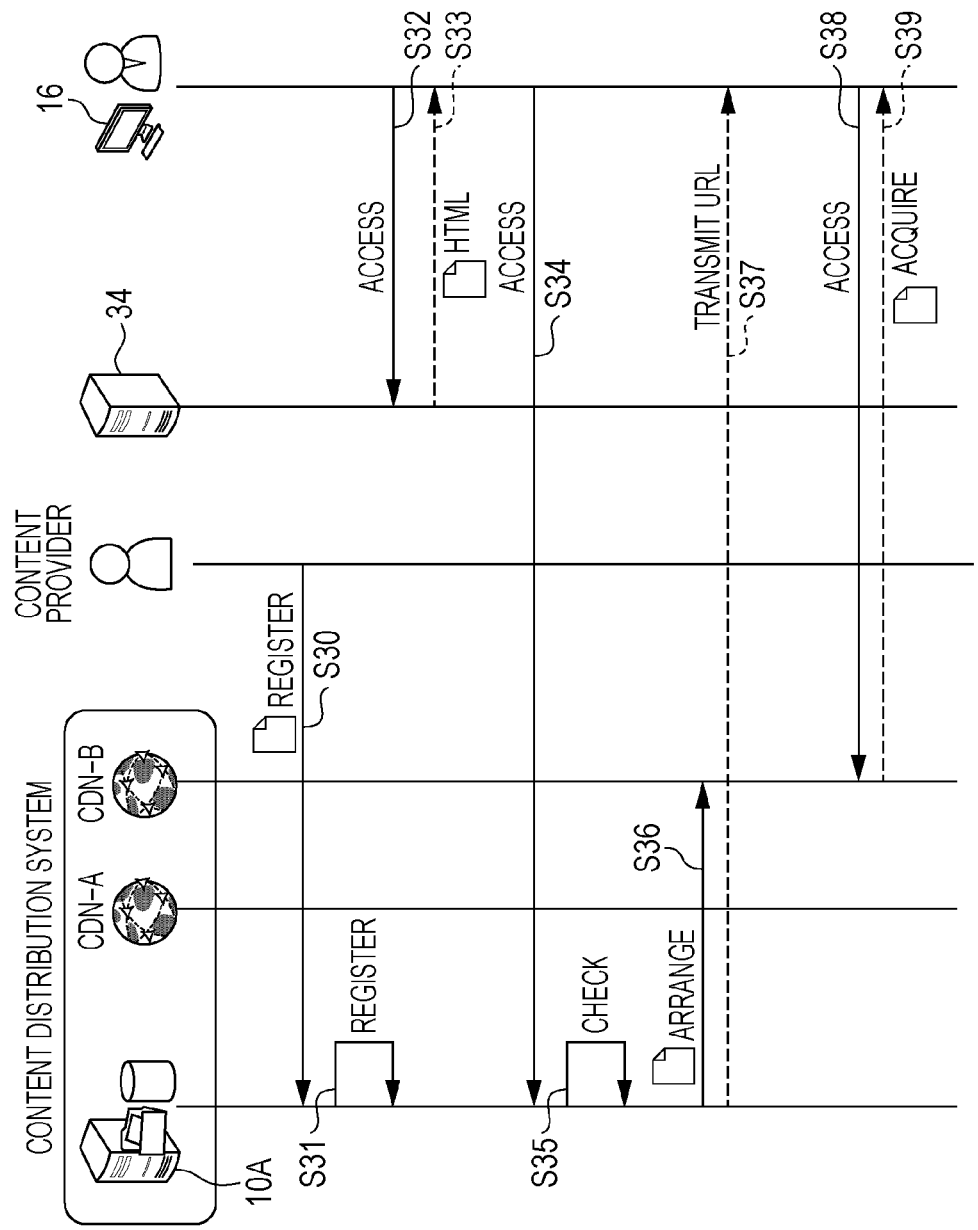
FIG. 12 is a sequence diagram illustrating an overview of a process according to the second exemplary embodiment.

A process performed by the content distribution system according to the second exemplary embodiment will be described hereinafter. FIG. 12 is a sequence diagram illustrating an overview of the process.

First, as in the first exemplary embodiment, a content provider uses an apparatus such as a terminal apparatus to send content to be distributed to the distribution management apparatus 10A to register the content (S30). The content is stored in the storage unit 30. In addition, as in the first exemplary embodiment, content attribute information is sent to and registered in the distribution management apparatus 10A. In the second exemplary embodiment, furthermore, in addition to the content, information concerning a user at a destination distribution location, namely, access restriction information and user interest information, is also sent to and registered in the distribution management apparatus 10A (S31). For example, the content provider determines the details of the access restriction information and the details of the user interest information. When new content is sent to the distribution management apparatus 10A, in the distribution management apparatus 10A, the content management unit 26 adds the attribute information on the new content to the content management table. Further, the user information management unit 36 adds the access restriction information to the access restriction management table, and adds the user interest information to the user interest management table.

Then, as in the first exemplary embodiment, the content user (the user at the destination distribution location) uses a terminal apparatus to access, for example, the business web server 34 (S32). The access is implemented by a web browser, for example. For instance, a terminal apparatus 16 is used here. The business web server 34 dynamically creates an HTML file and sends the created HTML file to a web browser on the terminal apparatus 16 (S33). The HTML file contains the URL of the distribution management apparatus 10A as the URL from which the content is acquired. The HTML file further includes a content identifier for identifying the content to be distributed.

Then, the web browser on the terminal apparatus 16 accesses the URL contained in the HTML file (S34). As described above, the URL is the URL of the distribution management apparatus 10A. Thus, the access from the terminal apparatus 16 to the distribution management apparatus 10A is implemented. At this time, the content identifier of the content to be distributed is sent from the terminal apparatus 16 to the distribution management apparatus 10A.

In the distribution management apparatus 10A, the distribution apparatus selection unit 28 checks management information (the distribution apparatus management table, the content management table, the access restriction management table, and the user interest management table) (S35) and arranges (stores) the content to be distributed (the content having the content identifier which has been sent from the terminal apparatus 16) in a specific distribution apparatus in accordance with conditions concerning the content to be distributed or the user at the destination distribution location (S36). For example, the content distribution system is assumed to include CDN-A and CDN-B which serve as distribution apparatuses. Each of the CDN-A and the CDN-B is assumed to have a function of distributing content via the Internet, by way of example. It is assumed that the CDN-A is a default CDN (distribution apparatus) and supports Internet distribution to all over the world and that the cost of the CDN-A is relatively low. It is assumed that the CDN-B supports an IP address range only within a certain country (e.g., Japan) and that the cost of the CDN-B is intermediate. It is assumed that, for example, the CDN suitable for the user at the destination distribution location is the CDN-B, rather than the default CDN-A, according to the characteristics of the distribution apparatuses (the CDN-A and the CDN-B), the attribute of the content, access restrictions, and the user's interest. In this case, the content to be distributed is arranged (stored) in the CDN-B. When the content to be distributed is arranged in the CDN-B, the content management unit 26 adds content arrangement information regarding the content to the content arrangement location management table. Then, the URL indicating the location in which the content is arranged is sent from the distribution management apparatus 10A to the terminal apparatus 16 (S37). The URL is information indicating a storage location on the CDN-B in which the content to be distributed is stored. If the content to be distributed has already been arranged in the CDN-B, the arrangement process in step S36 is not necessary.

Then, the web browser on the terminal apparatus 16 accesses the URL sent from the distribution management apparatus 10A (S38). Since the URL indicates the storage location on the CDN-B, the access from the terminal apparatus 16 to the CDN-B is implemented. Then, the web browser acquires the content to be distributed from the storage location indicated by the URL (S39).

Figure 13:
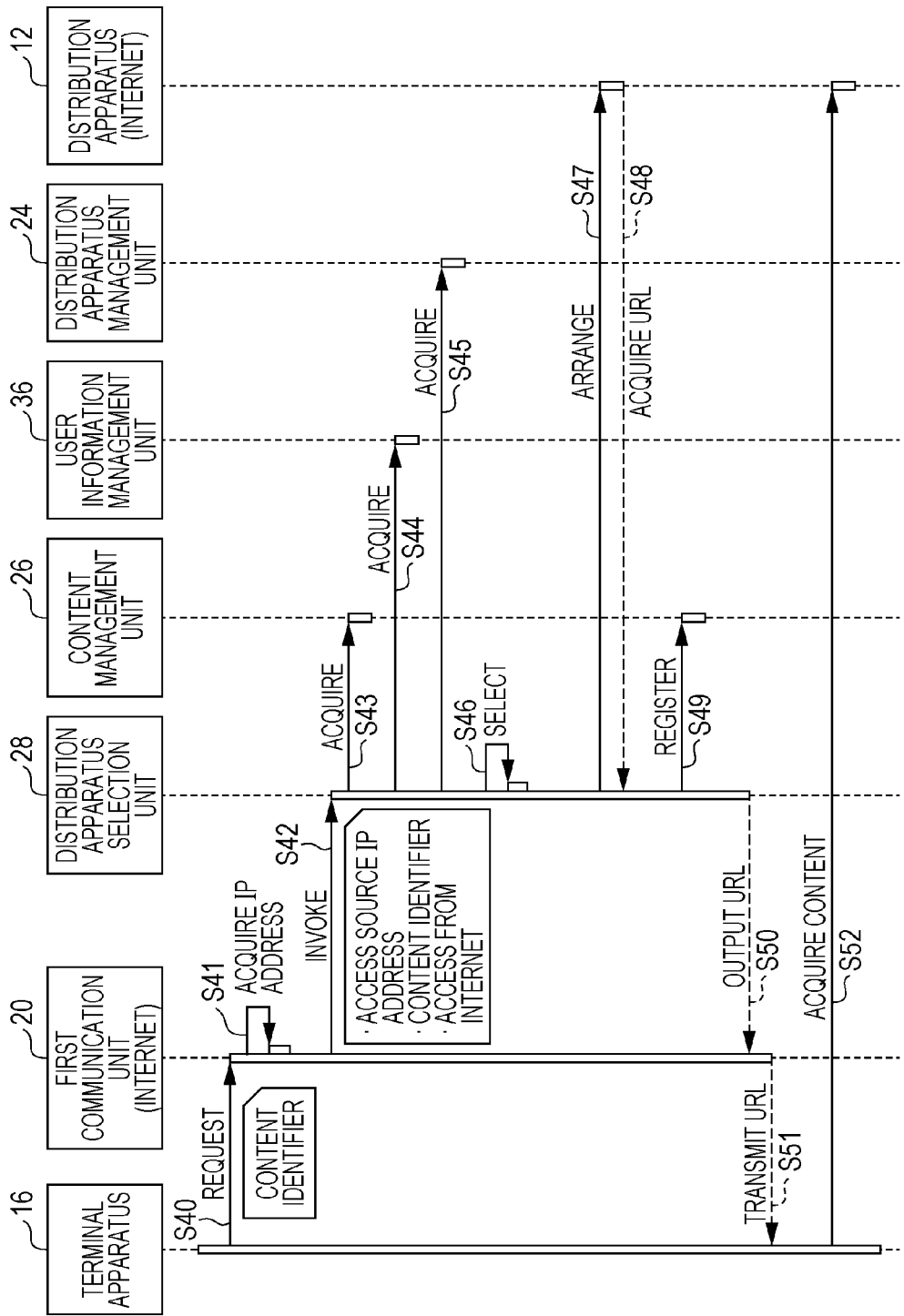
FIG. 13 is a sequence diagram illustrating the details of the process according to the second exemplary embodiment.

The process performed by the content distribution system according to the second exemplary embodiment will be described in detail hereinafter. FIG. 13 is a sequence diagram illustrating the details of the process. The processing after step S34 illustrated in FIG. 12 will be described here. That is, it is assumed that the content to be distributed has been registered in the distribution management apparatus 10A and has been stored in the storage unit 30. It is also assumed that a terminal apparatus 16 is used by the user at the destination distribution location.

First, the terminal apparatus 16 accesses the distribution management apparatus 10A via the communication path N1, which is the Internet, and sends to the distribution management apparatus 10A information indicating a request for acquiring content intended for distribution (S40). The information indicating the request includes the content identifier of the content to be distributed.

In the distribution management apparatus 10A, the first communication unit 20 accepts the information indicating the request. Upon acceptance of the information, the first communication unit 20 acquires the IP address of the access source or the user identifier of the user at the access source (S41). The IP address or the user identifier is acquired by using a method such as the method for Secure Sockets Layer (SSL) client authentication. Accordingly, the first communication unit 20 acquires the IP address of the terminal apparatus 16 or the user identifier of the user at the destination distribution location. In addition, the first communication unit 20 provides a process instruction to the distribution apparatus selection unit 28 (S42). That is, the function of selecting a distribution apparatus is invoked, and, subsequently, the distribution apparatus selection unit 28 performs a process. The process instruction (invocation instruction) includes the content identifier, the IP address of the terminal apparatus 16 or the user identifier of the user at the destination distribution location, and access information indicating that the terminal apparatus 16 has made access via the Internet.

The distribution apparatus selection unit 28 acquires content attribute information on the content intended for distribution from the content management table stored in the content management unit 26 by using the content identifier as a search key (S43). By referring to the content attribute information, the communication path (for Internet distribution or intranet distribution) available for the content to be distributed is identified.

The distribution apparatus selection unit 28 further acquires access restriction information from the access restriction management table stored in the user information management unit 36 by using the user identifier of the user at the destination distribution location or the IP address of the terminal apparatus 16 as a search key (S44). The distribution apparatus selection unit 28 further acquires user interest information from the user interest management table stored in the user information management unit 36 by using the user identifier or the IP address as a search key (S44). By referring to the access restriction information, the domain or IP address range that the terminal apparatus 16 is allowed to access is identified. Furthermore, by referring to the user interest information, the measure on which the user at the destination distribution location places emphasis is identified.

The distribution apparatus selection unit 28 further acquires distribution apparatus attribute information from the distribution apparatus management table stored in the distribution apparatus management unit 24 (S45). By referring to the distribution apparatus attribute information, the communication paths (for Internet distribution or intranet distribution) supported by individual distribution apparatuses are identified.

Then, the distribution apparatus selection unit 28 refers to the content attribute information, the access restriction information, the user interest information, and the distribution apparatus attribute information to select a distribution apparatus suitable for the delivery of the content intended for distribution to the terminal apparatus 16 (S46).

If access restriction information on the user at the destination distribution location has been registered in the access restriction management table, a distribution apparatus that satisfies conditions for the access restrictions indicated by the access restriction information is selected. If user interest information on the user at the destination distribution location has been registered in the user interest management table, a distribution apparatus that satisfies the condition for the user's interest indicated by the user interest information is selected. If access restriction information and user interest information on the user at the destination distribution location have been registered, a distribution apparatus that satisfies conditions both for the access restrictions and the user's interest is selected.

For instance, the content intended for distribution is assumed to be the "content A". With reference to the content management table illustrated in FIG. 4, the "content A" is available for both Internet distribution and intranet distribution. Thus, the "content A" is available for the delivery to the terminal apparatus 16, which has made access via the Internet. In addition, the user at the destination distribution location is assumed to be the "user A". With reference to the access restriction management table illustrated in FIG. 10, the domain that the "user A" is allowed to access is "*.xxx-.co.jp", and no restriction is imposed on the IP address range. With reference to the user interest management table illustrated in FIG. 11, the measure on which the "user A" places emphasis is "performance". Further, with reference to the distribution apparatus management table illustrated in FIG. 9, the "distribution apparatus A" supports Internet distribution, the domain of the "distribution apparatus A" is "cdn-a.xxx.co.jp", and the level of the performance of the "distribution apparatus A" is "A". Accordingly, the "distribution apparatus A" is a distribution apparatus that satisfies conditions for the "content A" and the "user A", that is, a distribution apparatus suitable for the delivery of the "content A" to the "user A". In this case, the "distribution apparatus A" is selected as the location (destination storage location) in which the "content A" is arranged.

If the access restriction information on the user at the destination distribution location has been registered and the user interest information on the user at the destination distribution location has not been registered, a distribution apparatus that satisfies conditions for the access restrictions indicated by the access restriction information (e.g., the condition for the domain) is selected as the location in which the "content A" is arranged from among distribution apparatuses supporting Internet distribution. If the user interest information on the user at the destination distribution location has been registered and the access restriction information on the user at the destination distribution location has not been registered, a distribution apparatus that satisfies the condition for the user's interest indicated by the user interest information (e.g., the condition in which emphasis is placed on performance) is selected as the location in which the "content A" is arranged from among distribution apparatuses supporting Internet distribution.

If neither the access restriction information on the user at the destination distribution location nor the user interest information on the user at the destination distribution location has been registered, a distribution apparatus that supports Internet distribution is selected as the location (destination storage location) in which the "content A" is arranged. In this case, if multiple distribution apparatuses support Internet distribution, a specific distribution apparatus is selected as the location (destination storage location) in which the "content A" is arranged in accordance with a predetermined condition. For example, a distribution apparatus whose "cost" is in level "A" is selected as the location (destination storage location) in which the "content A" is arranged. A distribution apparatus may be selected by using any other condition.

When the content to be distributed is not available for Internet distribution, the delivery of the content to the terminal apparatus 16 is prohibited. When no distribution apparatus supporting Internet distribution has been registered in the content distribution system, the delivery of the content to the terminal apparatus 16 is prohibited. In the cases described above, information indicating that the delivery of the content intended for distribution is prohibited is sent from the distribution management apparatus 10A to the terminal apparatus 16 and is displayed.

In the following description, the content intended for distribution is the "content A" and the "distribution apparatus A" has been selected as the location (destination storage location) in which the "content A" is arranged.

If the "content A" has not been arranged (stored) in the "distribution apparatus A" (e.g., the distribution apparatus 12), the distribution apparatus selection unit 28 sends the "content A" to the "distribution apparatus A" to store the "content A" in the distribution apparatus A" (S47). Then, the distribution apparatus selection unit 28 acquires from the "distribution apparatus A" the URL indicating the destination storage location of the "content A" on the "distribution apparatus A" (S48). The URL is registered in the content arrangement location management table in the content management unit 26 (S49). Accordingly, the state of the arrangement of the "content A" is managed in the content arrangement location management table.

Then, the distribution apparatus selection unit 28 outputs the URL indicating the destination storage location of the "content A" (S50). The URL is transmitted to the terminal apparatus 16 by the first communication unit 20 (S51). Then, the terminal apparatus 16 accesses the "distribution apparatus A" having the storage location indicated by the URL and acquires the "content A" from the "distribution apparatus A" (S52).

As described above, according to the second exemplary embodiment, if access restrictions have been set for the content user (the terminal apparatus at the destination distribution location), a distribution apparatus that satisfies conditions for the access restrictions is selected, and content to be distributed is arranged (stored) in the distribution apparatus. Further, if the interest of the content user has been registered, a distribution apparatus that satisfies the condition for the interest is selected. This may eliminate the need for the content provider, the administrator, or any other person or entity to manually select a distribution apparatus suitable for the distribution of the content while taking into account access restrictions for the content user or the interest of the content user. For example, if the content provider, the administrator, or any other person or entity does not know a distribution apparatus that satisfies conditions for the access restrictions for the content user or the interest of the content user, the content is arranged in a distribution apparatus suitable for the distribution of the content.

Third Exemplary Embodiment

Next, a content distribution system according to a third exemplary embodiment will be described. The content distribution system according to the third exemplary embodiment may include either the distribution management apparatus 10 according to the first exemplary embodiment illustrated in FIG. 2 or the distribution management apparatus 10A according to the second exemplary embodiment illustrated in FIG. 8. In the following description, the distribution management apparatus 10A is included, by way of example.

In the third exemplary embodiment, a distribution apparatus is selected by taking geographical conditions of distribution into account. FIG. 14 illustrates an example of a distribution apparatus management table. The distribution apparatus management table corresponds to an example of distribution apparatus attribute information and is information stored in the distribution apparatus management unit 24. In the distribution apparatus management table, for each distribution apparatus, a distribution apparatus identifier for identifying the distribution apparatus, information indicating a communication path (for Internet distribution or intranet distribution) supported by the distribution apparatus, information indicating the cost of the distribution apparatus, information indicating geographical restrictions of distribution, and other attribute information are associated with one another. The information indicating costs may not be included in the distribution apparatus management table. Other attribute information includes, for example, the information included in the distribution apparatus management table illustrated in FIG. 9, namely, the domain information, the IP address range, information concerning performance, and information concerning ecological sustainability. One or more of the attributes described above may be included in the distribution apparatus management table, or other attribute such as access restriction information or user interest information may not be included in the distribution apparatus management table. Each time a new distribution apparatus is registered in the content distribution system, information concerning the distribution apparatus is added to the distribution apparatus management table.

For example, in the distribution apparatus management table, the "distribution apparatus A" does not support distribution to a specific country (e.g., country X) as a geographical restriction of distribution. That is, the access to the distribution apparatus A from within country X is prohibited. On the other hand, no geographical restriction of distribution is set for the distribution apparatus B, the distribution apparatus C, or the distribution apparatus D. In other words, the distribution apparatus B, the distribution apparatus C, and the distribution apparatus D support distribution to all over the world. That is, access to the distribution apparatus B, the distribution apparatus C, and the distribution apparatus D from all over the world is allowed.

Figure 15:
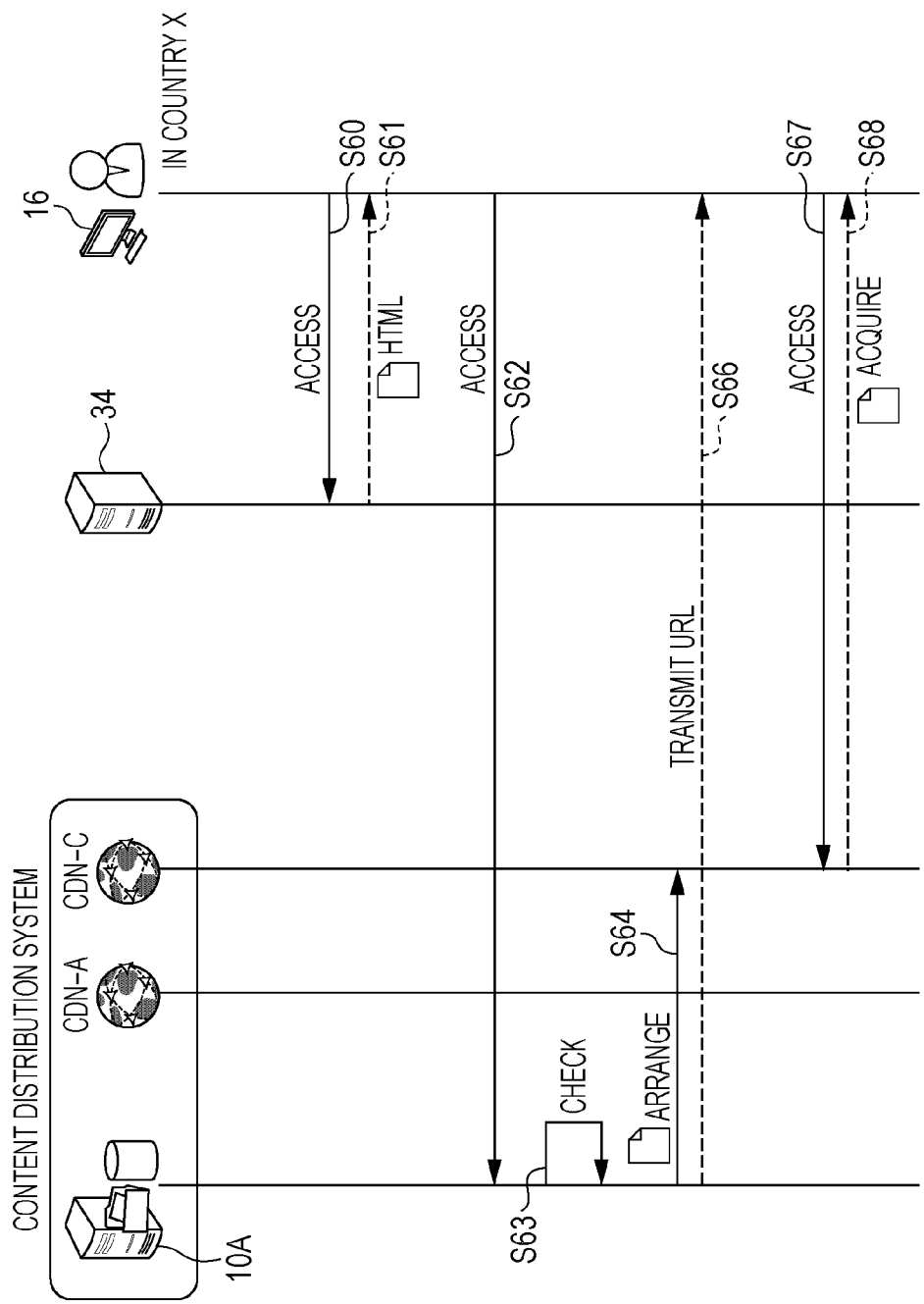
FIG. 15 is a sequence diagram illustrating a process according to a third exemplary embodiment.

The content distribution system according to the third exemplary embodiment will be described hereinafter. FIG. 15 is a sequence diagram illustrating the process.

As in the first and second exemplary embodiments, content to be distributed is registered in the distribution management apparatus 10A. For example, the processing of steps S30 and S31 illustrated in FIG. 12 is executed, and the content and other attribute information are registered in the distribution management apparatus 10A.

Then, as in the first and second exemplary embodiments, the content user (the user at the destination distribution location) uses a terminal apparatus to access, for example, the business web server 34 (S60). The access is implemented by a web browser, for example. For instance, a terminal apparatus 16 is used here. The business web server 34 dynamically creates an HTML file and sends the created HTML file to a web browser on the terminal apparatus 16 (S61). The HTML file contains the URL of the distribution management apparatus 10A as the URL from which the content is acquired. The HTML file further includes a content identifier for identifying the content to be distributed.

Then, the web browser on the terminal apparatus 16 accesses the URL contained in the HTML file (S62). As described above, the URL is the URL of the distribution management apparatus 10A. Thus, the access from the terminal apparatus 16 to the distribution management apparatus 10A is implemented. At this time, the content identifier of the content to be distributed is sent from the terminal apparatus 16 to the distribution management apparatus 10A.

In the distribution management apparatus 10A, the distribution apparatus selection unit 28 checks management information (the distribution apparatus management table, the content management table, the access restriction management table, and the user interest management table) (S63) and arranges (stores) the content to be distributed (the content having the content identifier which has been sent from the terminal apparatus 16) in a specific distribution apparatus in accordance with conditions concerning the content to be distributed or the user at the destination distribution location (S64).

For example, the content distribution system is assumed to include CDN-A and CDN-C which serve as distribution apparatuses. Each of the CDN-A and CDN-C is assumed to have a function of distributing content via the Internet, by way of example. The CDN-A is a default CDN (distribution apparatus), and corresponds to the "distribution apparatus A" illustrated in FIG. 14, for example. The CDN-A (distribution apparatus A) does not support Internet distribution to country X, and the cost of the CDN-A is relatively low. The CDN-C corresponds to the "distribution apparatus B" illustrated in FIG. 14, for example. The CDN-C (distribution apparatus C) supports Internet distribution to all over the world, and the cost of the CDN-C is set low.

If the terminal apparatus 16 has accessed the distribution management apparatus 10A from within country X, the content to be distributed is arranged (stored) in the CDN-C, which supports Internet distribution to all over the world, rather than in the default CDN-A, which does not support Internet distribution to country X. When conditions for access restrictions or the user's interest are taken into account in addition to the geographical restrictions of distribution, a CDN (distribution apparatus) that also satisfies the conditions is selected and the content to be distributed is arranged in the selected CDN.

When the content to be distributed is arranged in the CDN-C, the content management unit 26 adds content arrangement information concerning the content to the content arrangement location management table. Then, the URL indicating the location in which the content is arranged is sent from the distribution management apparatus 10A to the terminal apparatus 16 (S66). The URL is information indicating a storage location on the CDN-C in which the content to be distributed is stored. If the content to be distributed has already been arranged in the CDN-C, the arrangement process in step S64 is not necessary.

Then, the web browser on the terminal apparatus 16 accesses the URL sent from the distribution management apparatus 10A (S67). Since the URL indicates the storage location on the CDN-C, the access from the terminal apparatus 16 to the CDN-C is implemented. Then, the web browser acquires the content to be distributed from the storage location indicated by the URL (S68).

As described above, according to the third exemplary embodiment, a distribution apparatus that satisfies the geographical conditions of a content user (a terminal apparatus at a destination distribution location) is selected, and content to be distributed is arranged (stored) in the selected distribution apparatus. That is, if geographical restrictions of distribution have been set, content is arranged in a distribution apparatus for which distribution is not restricted and is distributed to a terminal apparatus. In the example described above, even if the terminal apparatus 16 at the destination distribution location has made access from within country X, content is arranged in a distribution apparatus (the CDN-C) to which access from within country X is allowed, and the distribution apparatus distributes the content to the terminal apparatus 16. This may eliminate the need for the content provider, the administrator, or any other person or entity to manually select a distribution apparatus suitable for the distribution of the content while taking into account geographical restrictions of distribution that are imposed on the content user. For example, if the content provider, the administrator, or any other person or entity does not know a distribution apparatus that satisfies conditions for the geographical restrictions of distribution, the content is arranged in a distribution apparatus suitable for the distribution of the content.

Fourth Exemplary Embodiment

Next, a content distribution system according to a fourth exemplary embodiment will be described. The content distribution system according to the fourth exemplary embodiment may include either the distribution management apparatus 10 according to the first exemplary embodiment illustrated in FIG. 2 or the distribution management apparatus 10A according to the second exemplary embodiment illustrated in FIG. 8. In the following description, the distribution management apparatus 10 is included, by way of example.

In the fourth exemplary embodiment, the control unit 32 of the distribution management apparatus 10 includes an authentication unit. In response to access to the distribution management apparatus 10 from a terminal apparatus via the Internet, the authentication unit executes user authentication. When the authentication is successful, content to be distributed is arranged in a specific distribution apparatus and is distributed to the terminal apparatus. In the fourth exemplary embodiment, for example, user authentication information is stored in advance in the storage unit 30 of the distribution management apparatus 10. Examples of the user authentication information include a user identifier and a password. The fourth exemplary embodiment will be described in detail hereinafter.

FIG. 16 illustrates an example of a content management table. The content management table is an example of content attribute information and is information stored in the content management unit 26. In the content management table, a content identifier for identifying content, information indicating a communication path available for the content, information indicating conditions for Internet distribution, and information indicating restrictions are associated with one another. The conditions for Internet distribution are conditions for distributing, via the Internet, content to be distributed. The conditions define, for example, access from a user who has been authenticated, access from a specific IP address range, access from a specific authenticated user, and so on. The restrictions are conditions concerning security for content to be distributed and are restrictions imposed on use of the content. The restrictions define, for example, encrypting the content with a public key of a user, the expiration period within which the content can be acquired, and so on. For example, each time new content is registered in the distribution management apparatus 10, information on the attribute of the content is added to the content management table.

For instance, "content A" is available for both distribution via the Internet and distribution via an intranet. The "content A" is distributed to only authenticated users via the Internet. In addition, the encryption of the "content A" when the content is to be arranged in a distribution apparatus is set as a restriction. Further, "content B" is distributed to only terminal apparatuses within a specific IP address range, and the acquisition of the "content B" expires in 24 hours. Further, "content C" is distributed to only specific users among authenticated users. The acquisition of the "content C" expires in an hour. The restrictions are optional and may not be included in the content management table.

FIG. 17 illustrates an example of an access-allowed user management table. The access-allowed user management table is, for example, information stored in the storage unit 30. The access-allowed user management table is information indicating the "specific authenticated users" in the content management table illustrated in FIG. 16. The access-allowed user management table specifies, for content that is to be distributed to only specific authenticated users, the identifiers of users to which the content is allowed to be distributed. For example, the "content C" is content that is allowed to be distributed to "user A", "user X", and "user Y". If no "specific authenticated user" is specified in the content management table, the access-allowed user management table may not be used. For example, each time new content is registered in the distribution management apparatus 10, the identifier of a user who is allowed to access the content is added to the access-allowed user management table. For example, the content provider determines a user who is allowed to access specific content.

Figure 18:
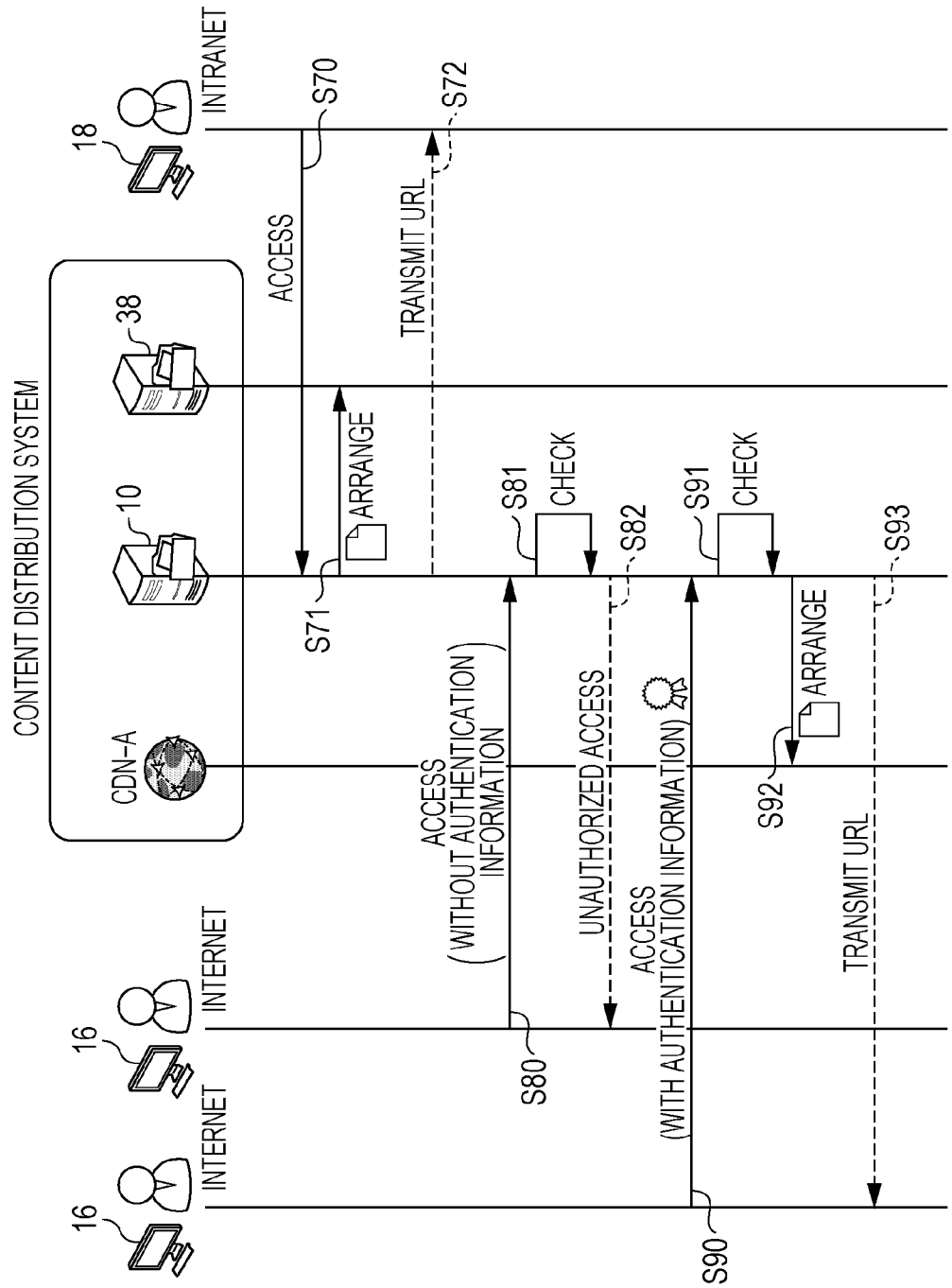
FIG. 18 is a sequence diagram illustrating a process according to a fourth exemplary embodiment.

A process performed by the content distribution system according to the fourth exemplary embodiment will be described hereinafter. FIG. 18 is a sequence diagram illustrating the process.

As in the first exemplary embodiment, content to be distributed is registered in the distribution management apparatus 10. For example, the processing of step S01 illustrated in FIG. 6 is executed, and the content and other attribute information are registered in the distribution management apparatus 10. It is assumed that the content is available for both intranet distribution and Internet distribution and that user authentication is not required for intranet distribution whereas user authentication is required for Internet distribution.

Then, as in the first exemplary embodiment, the content user (the user at the destination distribution location) uses a terminal apparatus to access, for example, a business web server. The access is implemented by a web browser, for example. The business web server sends an HTML file to the terminal apparatus. The HTML file contains the URL of the distribution management apparatus 10 as the URL from which the content is acquired. The HTML file further includes a content identifier for identifying the content to be distributed.

For example, the terminal apparatus 18 is used. As illustrated in FIG. 1, the terminal apparatus 18 is an apparatus connected to the communication path N2, which is an intranet. A web browser on the terminal apparatus 18 accesses the URL included in the HTML file (S70). Thus, the access from the terminal apparatus 18 to the distribution management apparatus 10 is implemented. At this time, the content identifier of the content to be distributed is sent from the terminal apparatus 18 to the distribution management apparatus 10.

In the distribution management apparatus 10, the distribution apparatus selection unit 28 checks management information (the distribution apparatus management table, the content management table, and the access-allowed user management table) and arranges (stores) the content to be distributed (the content having the content identifier which has been sent from the terminal apparatus 18) in a specific distribution apparatus in accordance with conditions concerning the content to be distributed or the user (S71). Since the terminal apparatus 18 has accessed the distribution management apparatus 10 via an intranet, the content to be distributed is arranged in a distribution apparatus that supports intranet distribution (an intranet server 38) without any request for user authentication. Then, the URL indicating the location in which the content is arranged is sent from the distribution management apparatus 10 to the terminal apparatus 18 (S72). The URL is information indicating a storage location on the intranet server 38 in which the content to be distributed is stored. If the content to be distributed has already been arranged in the intranet server 38, the arrangement process in step S71 is not necessary.

Then, the web browser on the terminal apparatus 18 accesses the URL sent from the distribution management apparatus 10 and acquires the content to be distributed from the storage location indicated by the URL. That is, the content is acquired from the intranet server 38.

In another example, a terminal apparatus 16 is used. As illustrated in FIG. 1, the terminal apparatus 16 is a terminal connected to the communication path N1, which is the Internet. A web browser on the terminal apparatus 16 accesses the URL included in the HTML file (S80). At this time, the content identifier of the content to be distributed is sent from the terminal apparatus 16 to the distribution management apparatus 10.

In the distribution management apparatus 10, the distribution apparatus selection unit 28 checks management information (the distribution apparatus management table, the content management table, and the access-allowed user management table) (S81). The terminal apparatus 16 has accessed the distribution management apparatus 10 via the Internet. If the content to be distributed is the "content A", as illustrated in FIG. 16, the "content A" is distributed to only authenticated users via the Internet. Thus, user authentication is required to distribute the "content A". Since no user authentication information has been sent from the terminal apparatus 16 at the time of access, the authentication fails. In this case, information indicating unauthorized access is transmitted from the distribution management apparatus 10 to the terminal apparatus 16 and is displayed (S82).

In still another example, another terminal apparatus 16 is used. A web browser on the terminal apparatus 16 accesses the URL included in the HTML file (S90). At this time, the content identifier of the content to be distributed and user authentication information are sent from the terminal apparatus 16 to the distribution management apparatus 10.

In the distribution management apparatus 10, the distribution apparatus selection unit 28 checks management information (the distribution apparatus management table, the content management table, and the access-allowed user management table) (S91). The terminal apparatus 16 has accessed the distribution management apparatus 10 via the Internet. If the content to be distributed is the "content A", the "content A" is distributed to only authenticated users via the Internet. Since user authentication information has been sent from the terminal apparatus 16 at the time of access, the authentication unit executes an authentication process. If user authentication information stored in the storage unit 30 corresponds to the user authentication information sent from the terminal apparatus 16 (e.g., if user authentication information stored in the storage unit 30 matches the user authentication information sent from the terminal apparatus 16), the authentication is successful. On the other hand, if the user authentication information sent from the terminal apparatus 16 does not correspond to user authentication information stored in the storage unit 30, the authentication fails.

If the authentication is successful, the content to be distributed is arranged in a distribution apparatus (e.g., the CDN-A) that supports Internet distribution (S92). Then, the URL indicating the location in which the content is arranged is sent from the distribution management apparatus 10 to the terminal apparatus 16 (S93). The URL is information indicating a storage location on the CDN-A in which the content to be distributed is stored. If the content to be distributed has already been arranged in the CDN-A, the arrangement process in step S92 is not necessary. As an optional process, the expiration period within which the content is distributed may be set or the content may be encrypted. Then, the web browser on the terminal apparatus 16 accesses the URL sent from the distribution management apparatus 10 and acquires the content to be distributed from the storage location indicated by the URL. For example, the content is acquired from the CDN-A.

If the authentication has failed, information indicating unauthorized access is transmitted from the distribution management apparatus 10 to the terminal apparatus 16 and is displayed.

As described above, according to the fourth exemplary embodiment, security for an object may be guaranteed for the Internet distribution of the object. For example, an object that is typically distributed to intranet users is also distributed via the Internet if the conditions for security are satisfied.

Fifth Exemplary Embodiment

Next, a content distribution system according to a fifth exemplary embodiment will be described. The content distribution system according to the fifth exemplary embodiment includes the distribution management apparatus 10A according to the third exemplary embodiment.

In the fifth exemplary embodiment, when a distribution apparatus is selected by taking geographical conditions of distribution into account, if the geographical conditions of the content user (the user at the destination distribution location) are changed, content to be distributed is rearranged in a destination storage location in accordance with the change in the geographical conditions.

Figure 19:
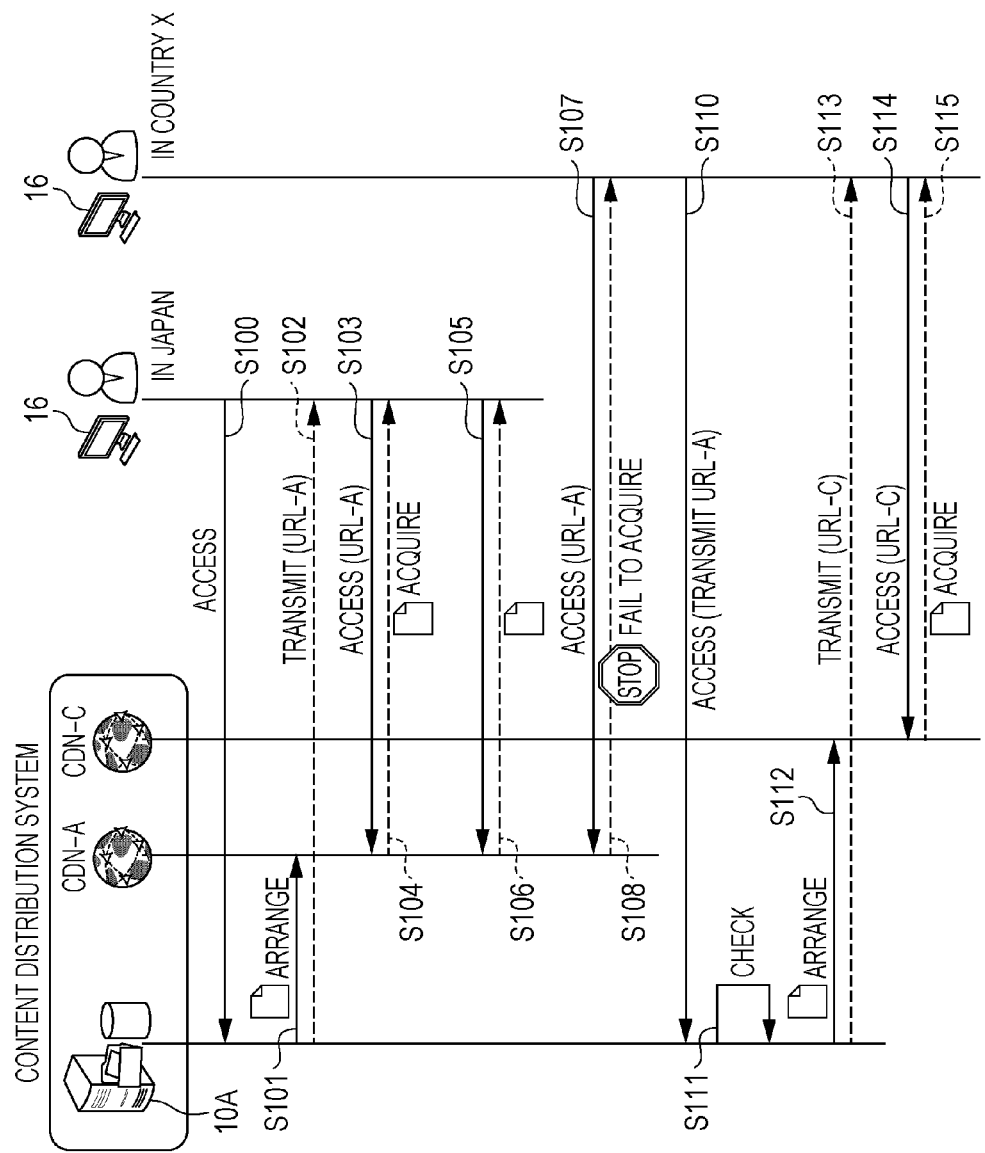
FIG. 19 is a sequence diagram illustrating a process according to a fifth exemplary embodiment.

A process performed by the content distribution system according to the fifth exemplary embodiment will be described hereinafter. FIG. 19 is a sequence diagram illustrating the process.

As in the third exemplary embodiment described above, content to be distributed and other attribute information are registered in the distribution management apparatus 10A.

Then, the content user (the user at the destination distribution location) uses a terminal apparatus 16 connected to the Internet to access a business web server, for example. The access is implemented by a web browser, for example. The business web server sends an HTML file to the terminal apparatus 16. The HTML file contains the URL of the distribution management apparatus 10A as the URL from which the content is acquired. The HTML file further includes a content identifier for identifying the content to be distributed.

Then, a web browser on the terminal apparatus 16 accesses the URL included in the HTML file (S100). The access is assumed to be provided from within Japan, for example. At this time, the content identifier of the content to be distributed is sent from the terminal apparatus 16 to the distribution management apparatus 10A.

In the distribution management apparatus 10A, the distribution apparatus selection unit 28 checks management information (the distribution apparatus management table, the content management table, the access restriction management table, and the user interest management table) and arranges (stores) the content to be distributed (the content having the content identifier which has been sent from the terminal apparatus 16) in a specific distribution apparatus in accordance with conditions concerning the content to be distributed or the user at the destination distribution location (S101).

For example, the content distribution system is assumed to include CDN-A and CDN-C which serve as distribution apparatuses. Each of the CDN-A and the CDN-C has a function of distributing content via the Internet, by way of example. The CDN-A is a default CDN (distribution apparatus) and corresponds to the "distribution apparatus A" illustrated in FIG. 14, for example. The CDN-A (distribution apparatus A) does not support Internet distribution to country X, and the cost of the CDN-A is relatively low. The CDN-C corresponds to the "distribution apparatus C" illustrated in FIG. 14, for example. The CDN-C (distribution apparatus C) supports Internet distribution to all over the world. That is, the CDN-C supports Internet distribution to country X.

If the terminal apparatus 16 has accessed the distribution management apparatus 10A from within Japan, the content to be distributed is arranged (stored) in the default CDN-A, for example. If the conditions for access restrictions or the user's interest are taken into account in addition to the geographical restrictions of distribution, a CDN (distribution apparatus) that also satisfies the conditions is selected and the content to be distributed is arranged in the selected CDN.

When the content to be distributed is arranged in the CDN-A, the content management unit 26 adds content arrangement information concerning the content to the content arrangement location management table. For example, the content to be distributed is the "content A". In this case, in the content arrangement location management table illustrated in FIG. 5, the identifier of the "content A", the identifier of the distribution apparatus (distribution apparatus A), and URL-A indicating the storage location on the CDN-A (distribution apparatus A) are associated with one another. Then, URL-A indicating the location in which the content is arranged is sent from the distribution management apparatus 10A to the terminal apparatus 16 (S102). If the content to be distributed has already been arranged in the CDN-A, the arrangement process in step S101 is not necessary.

Then, the web browser on the terminal apparatus 16 accesses URL-A (S103). Since URL-A indicates the storage location on the CDN-A, the access from the terminal apparatus 16 to the CDN-A is implemented. Then, the web browser acquires the content to be distributed from the storage location indicated by URL-A (S104).

Subsequently, the following situation is assumed: the content user directly accesses URL-A without accessing the distribution management apparatus 10A (S105) and acquires the content to be distributed from the CDN-A (S106). The CDN-A supports Internet distribution to Japan. Thus, when the terminal apparatus 16 has accessed the CDN-A from within Japan, the content is provided from the CDN-A to the terminal apparatus 16. In this case, it is anticipated that the content user will move to country X and directly access the CDN-A from within country X by using the terminal apparatus 16 (S107). However, the CDN-A does not support Internet distribution to country X. Thus, a problem arises in that the content is not provided from the CDN-A to the terminal apparatus 16 (S108).

In the fifth exemplary embodiment, to address the problem described above, the terminal apparatus 16 transmits a URL which has been acquired and to which access has been prohibited (i.e., URL-A) to the distribution management apparatus 10A (S110).

In the distribution management apparatus 10A, the distribution apparatus selection unit 28 checks management information (the content arrangement location management table, the distribution apparatus management table, the content management table, the access restriction management table, and the user interest management table) (S111) and rearranges the content to be distributed in another distribution apparatus (S112). Specifically, the following process is executed.

As described above, in the content arrangement location management table, content and the URL of the location in which the content is arranged are associated with each other.

Thus, by referring to the content arrangement location management table, the content (content A) corresponding to the URL (URL-A) to which access has been prohibited is identified. In addition, since the terminal apparatus 16 has accessed the distribution management apparatus 10A from within country X, the CDN-C, which supports Internet distribution to country X, is selected as a distribution apparatus. Then, the content A to be distributed is arranged in the CDN-C. If the conditions for access restrictions or the user's interest are taken into account in addition to the geographical restrictions of distribution, a CDN (distribution apparatus) that also satisfies the conditions is selected and the content to be distributed is arranged in the selected CDN.

If the content to be distributed is arranged in the CDN-C, the content management unit 26 adds content arrangement information concerning the content to the content arrangement location management table. Then, URL-C indicating the location in which the content is arranged is sent from the distribution management apparatus 10A to the terminal apparatus 16 (S113).

Then, the web browser on the terminal apparatus 16 accesses URL-C (S114). Since URL-C indicates the storage location on the CDN-C, the access from the terminal apparatus 16 to the CDN-C is implemented. Then, the web browser acquires the content to be distributed from the storage location indicated by URL-C (S115).

As described above, according to the fifth exemplary embodiment, after content has been arranged in a specific distribution apparatus, if access to the specific distribution apparatus is prohibited due to the geographical restrictions of distribution, the content is rearranged in another distribution apparatus to which access is allowed and the content is provided to the content user.

According to the first to the fifth exemplary embodiments, content is arranged in a distribution apparatus suitable for each user or each terminal apparatus in accordance with the situation of the user or the terminal apparatus.

In the first to the fifth exemplary embodiments described above, content to be distributed may be arranged in multiple distribution apparatuses that satisfy conditions. In this case, URLs indicating the respective locations in which the content is arranged are sent to a terminal apparatus. The content user may select a specific distribution apparatus from among the multiple distribution apparatuses and may acquire the content from the specific distribution apparatus.

Sixth Exemplary Embodiment

Figure 20:
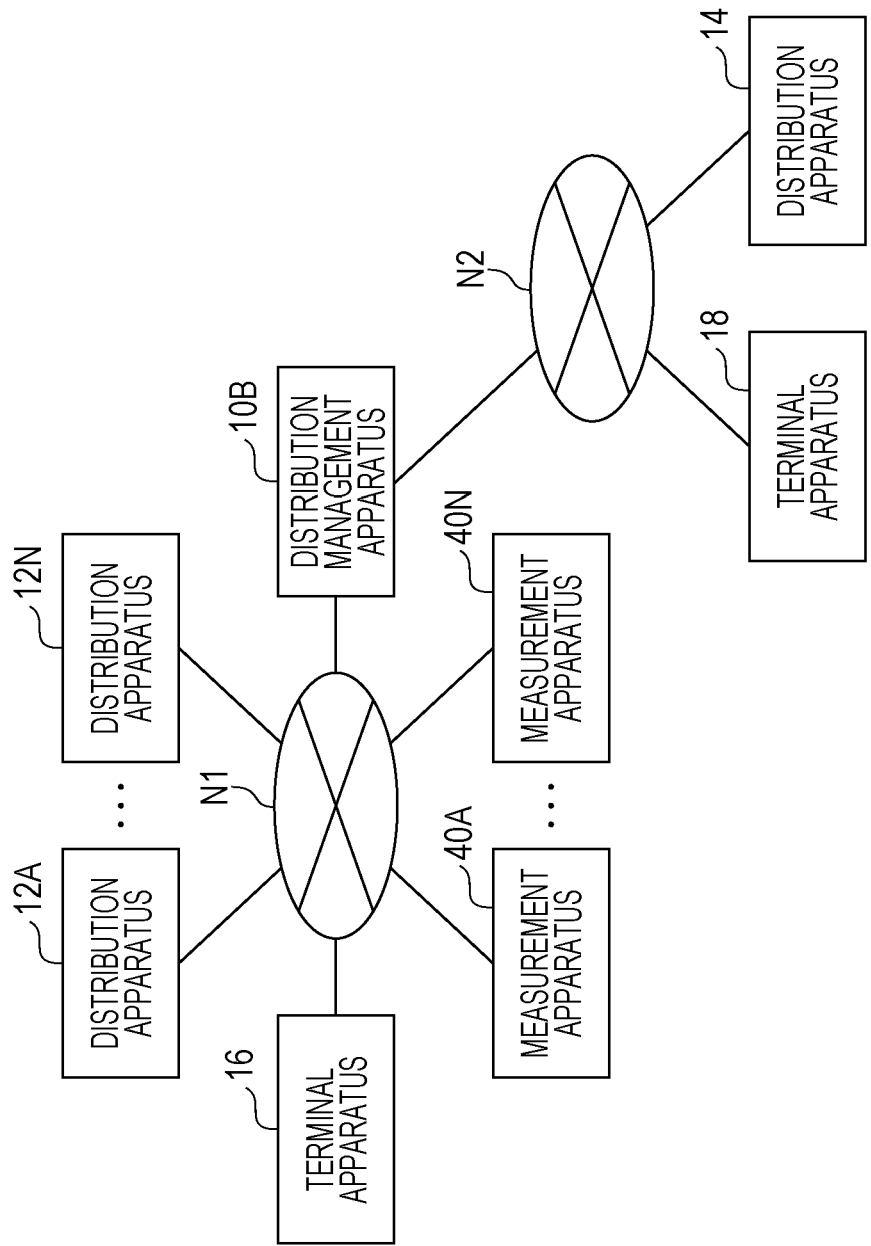
FIG. 20 is a block diagram illustrating a content distribution system according to a sixth exemplary embodiment.

A content distribution system according to a sixth exemplary embodiment will be described hereinafter. FIG. 20 illustrates an example of a content distribution system according to the sixth exemplary embodiment.

The content distribution system according to the sixth exemplary embodiment includes a distribution management apparatus 10B instead of the distribution management apparatus 10. The distribution management apparatus 10B serves as an information processing apparatus. The content distribution system according to the sixth exemplary embodiment further includes distribution apparatuses 12A, . . . , and 12N and measurement apparatuses 40A, . . . , and 40N. The distribution management apparatus 10B, the distribution apparatuses 12A, . . . , and 12N, and the measurement apparatuses 40A, . . . , and 40N each have a function of communicating with another apparatus via the communication path N1. The communication path N2, the terminal apparatuses 16 and 18, and the distribution apparatus 14 have the same or substantially the same configuration as those of the content distribution system according to the first exemplary embodiment.

Similarly to the distribution apparatus 12 according to the first exemplary embodiment, each of the distribution apparatuses 12A, . . . , and 12N has a function of distributing content via the communication path N1 (e.g., the Internet). The distribution apparatuses 12A, . . . , and 12N may be installed in the same area (e.g., in the same country or the same region) or may be installed in different areas (e.g., in different countries or different regions). Each of the distribution apparatuses 12A, . . . , and 12N is hereinafter referred to sometimes as the "distribution apparatus 12".

The measurement apparatuses 40A, . . . , and 40N are installed in different measurement areas (such as different countries or different regions) and each measure the communication state (communication performance) with each of the distribution apparatuses 12A, . . . , and 12N. Each of the measurement apparatuses 40A, . . . , and 40N is hereinafter referred to sometimes as the "measurement apparatus 40". That is, one of the measurement apparatuses 40 is installed in each measurement area (such as each country or each region), and each of the measurement apparatuses 40 measures the communication state with each of the distribution apparatus 12.

For example, each of the measurement apparatuses 40A, . . . , and 40N accesses the distribution apparatuses 12A, . . . , and 12N to acquire measurement files (e.g., dummy data) from the distribution apparatuses 12A, . . . , and 12N, and measures the respective communication states for the distribution apparatuses 12. Examples of measurement items for the communication states include the times taken to acquire (download) the measurement files, the number of measurement files that have not been successfully acquired, and the failure rate of measurement files. Each of the measurement apparatuses 40 measures the measurement items (such as the times taken to acquire measurement files, the number of measurement files that have not been successfully acquired, and the failure rate of measurement files). The measurement files may be stored in the distribution apparatuses 12 in advance, for example, or may be distributed from the distribution management apparatus 10B to the distribution apparatuses 12. The measurement values of the measurement items for each of the distribution apparatuses 12, which are obtained by each of the measurement apparatuses 40, correspond to the communication state between a measurement area (such as a country or region) in which the corresponding one of the measurement apparatuses 40A, . . . , and 40N is installed and each of the distribution apparatuses 12A, . . . , and 12N. Each of the measurement apparatuses 40 transmits to the distribution management apparatus 10B measurement result information that includes the respective measurement values of the measurement items for each of the distribution apparatuses 12.

Each of the measurement apparatuses 40 is associated with measurement apparatus identification information for identifying the measurement apparatus 40 or measurement area identification information for identifying the measurement area in which the measurement apparatus 40 is set. The measurement result information includes measurement apparatus identification information for identifying the measurement apparatus 40 for which the measurement results are obtained or measurement area identification information for identifying the measurement area in which the measurement apparatus 40 is installed. The distribution management apparatus 10B manages which of the measurement apparatuses 40 is installed and in which measurement area the measurement apparatus 40 is installed.

Each of the measurement apparatuses 40 acquires a measurement file from each of the distribution apparatuses 12 to measure a communication state at each preset time or on each preset date, for example. Thus, communication states between measurement areas in which the measurement apparatuses 40 are installed and the distribution apparatuses 12 are measured at each time or on each date.

When a user submits a request via the communication path N1 (the Internet) to acquire content, the distribution management apparatus 10B changes the distribution apparatus 12 in which the content to be distributed is to be arranged (stored) in accordance with the communication states between the area in which the user has submitted the request to acquire the content (the request source area or access source area) and the distribution apparatuses 12. When a user submits a request via the communication path N2 (e.g., an intranet) to acquire content, as in the first exemplary embodiment, the distribution management apparatus 10B stores content to be distributed in the distribution apparatus 14.

The configuration of the distribution management apparatus 10B will be described in detail hereinafter with reference to FIG. 21. FIG. 21 illustrates an example of the distribution management apparatus 10B according to the sixth exemplary embodiment.

A first communication unit 20 and a second communication unit 22 respectively have the same or substantially the same functions as the first communication unit 20 and the second communication unit 22 according to the first exemplary embodiment.

A distribution apparatus management unit 24 holds distribution apparatus attribute information indicating the attributes of individual distribution apparatuses to manage the distribution apparatuses. As in the first exemplary embodiment, the distribution apparatus attribute information includes information indicating communication paths supported by the distribution apparatuses. Alternatively, as in the second exemplary embodiment, the distribution apparatus attribute information may include information indicating communication paths supported by the distribution apparatuses, information indicating communication ranges for the distribution apparatuses, measure information indicating measures for the distribution apparatuses, and other information. As in the third exemplary embodiment, the distribution apparatus attribute information may further include information indicating the costs of the distribution apparatuses, information indicating geographical restrictions of distribution, and so on. For example, each time a new distribution apparatus is registered in the content distribution system, the distribution apparatus management unit 24 holds attribute information on the new distribution apparatus.

A content management unit 26 has the same or substantially the same function as the content management unit 26 according to the first exemplary embodiment.

A user information management unit 36 has the same or substantially the same function as the user information management unit 36 according to the second exemplary embodiment. The distribution management apparatus 10B may not necessarily include the user information management unit 36.

A communication state management unit 42 holds measurement area management information and communication state information (communication performance information) to manage communication states (communication performances) between individual measurement areas and the distribution apparatuses 12. The communication state management unit 42 further holds installation location information indicating measurement areas in which the measurement apparatuses 40 are installed. By referring to the installation location information, the respective measurement areas in which the measurement apparatuses 40 are installed are identified.

The measurement area management information includes, for example, information indicating measurement areas in which the measurement apparatuses 40 are installed, and information indicating the address (e.g., IP address) ranges corresponding to the measurement areas. Each of the IP addresses of the measurement areas is an IP address to which the communication state measured by the measurement apparatus 40 installed in the corresponding one of the measurement areas is applied.

The communication state information is information indicating communication states between measurement areas and the distribution apparatuses 12, and includes, for example, information indicating the measurement areas in which the measurement apparatuses 40 are installed, information indicating the distribution apparatuses 12 as measurement targets, information indicating the dates and times of measurement, measurement information indicating measurement results (measurement values) obtained by the measurement apparatuses 40, and so on. The measurement information is, for example, information indicating the times taken to acquire measurement files, the failure rate of measurement files, and so on. Upon receipt of measurement result information transmitted from each of the measurement apparatuses 40, the communication state management unit 42 generates communication state information on the basis of the measurement result information. Since the measurement result information is associated with measurement apparatus identification information or measurement area identification information, the measurement apparatus 40 that has transmitted measurement result information, that is, the measurement area in which the measurement apparatus 40 is installed, is identified by using the measurement apparatus identification information or measurement area identification information. Each time the communication state management unit 42 receives measurement result information from each of the measurement apparatuses 40, the communication state management unit 42 updates the communication state information.

A distribution apparatus selection unit 28 has a function of storing content to be distributed in a specific distribution apparatus on the basis of the distribution apparatus attribute information, the content attribute information, and the communication state information. The distribution apparatus selection unit 28 changes the distribution apparatus 12 in which the content to be distributed is to be arranged (stored) in accordance with the communication state between the area in which the user has submitted a request to acquire the content (the request source area or access source area) and each of the distribution apparatuses 12. For example, the distribution apparatus selection unit 28 arranges (stores) the content to be distributed in the distribution apparatus 12 for which the communication state with the request source area matches a specific communication state condition.

The distribution apparatus selection unit 28 may select the distribution apparatus 12 in which the content to be distributed is to be stored by using, additionally, the conditions according to the second exemplary embodiment or the conditions according to the third exemplary embodiment. For example, the distribution apparatus selection unit 28 may select the distribution apparatus 12 in which the content to be distributed is to be stored on the basis of the distribution apparatus attribute information, the content attribute information, the communication state information, and the user interest information or may select the distribution apparatus 12 in which the content to be distributed is to be stored on the basis of also the access restriction information. Alternatively, the distribution apparatus selection unit 28 may select the distribution apparatus 12 in which the content to be distributed is to be stored on the basis of the distribution apparatus attribute information, the content attribute information, the communication state information, and the information indicating geographical conditions of distribution.

A storage unit 30 and a control unit 32 respectively have the same or substantially the same functions as the storage unit 30 and the control unit 32 according to the first exemplary embodiment.

The content distribution system according to the sixth exemplary embodiment will be described in more detail hereinafter.

FIG. 22 illustrates an example of measurement URL information. The measurement URL information is information indicating the URLs of the distribution apparatuses 12 in which measurement files are arranged (stored). Each of the measurement files is preset data and is stored in one of the distribution apparatuses 12 in advance. For example, measurement files having the same data volume and the same data format are stored in advance in the distribution apparatuses 12. In the example illustrated in FIG. 22, measurement files having a data volume of 1 Mbyte are stored in the distribution apparatuses 12. The measurement URL information is transmitted from the distribution management apparatus 10B to the measurement apparatuses 40 in advance, for example, and is stored in advance in the measurement apparatuses 40. Each of the measurement apparatuses 40 accesses each of the URLs specified in the measurement URL information and acquires a measurement file from the corresponding one of the distribution apparatuses 12.

The operation of each of the measurement apparatuses 40 for measuring communication states will be described hereinafter with reference to FIG. 23. FIG. 23 is a sequence diagram illustrating the operation of each of the measurement apparatuses 40. The operation of the measurement apparatus 40A out of the measurement apparatuses 40A, . . . , and 40N will be described, by way of example. The operations of the other measurement apparatuses 40 are the same or substantially the same as the operation of the measurement apparatus 40A.

The measurement apparatus 40A accesses URLs (the URLs indicating the destination storage locations of the measurement files) specified in the measurement URL information on each date or at each time, for example, to acquire the respective measurement files from the distribution apparatuses 12A, . . . , and 12N, measures, for each of the distribution apparatuses 12, the time (download time) taken to acquire the corresponding one of the measurement files, and detects whether a download failure has occurred (S120). Accordingly, measurement result information (information indicating the download time and information indicating the presence or absence of a download failure) is acquired for each of the distribution apparatuses 12. The measurement apparatus 40A transmits the measurement result information for each of the distribution apparatuses 12 to the distribution management apparatus 10B (S121). In the distribution management apparatus 10B, the communication state management unit 42 saves the measurement result information transmitted from the measurement apparatus 40A and updates the communication state information (communication performance information) on the basis of the measurement result information (S122). The measurement apparatuses 40 other than the measurement apparatus 40A also transmit measurement result information to the distribution management apparatus 10B. The communication state management unit 42 saves the measurement result information transmitted from the measurement apparatuses 40 and updates the communication state information on the basis of the saved measurement result information.

The measurement areas will be described in detail hereinafter with reference to FIG. 24. FIG. 24 illustrates an example of a measurement area management table. The measurement area management table corresponds to an example of measurement area management information and is information stored in the communication state management unit 42. In the measurement area management table, information indicating a measurement area in which each of the measurement apparatuses 40 is installed and information indicating the IP address range corresponding to the measurement area are associated with each other. The IP address range is a range to which the communication state measured by the measurement apparatus 40 installed in the associated measurement area is applied. In the example illustrated in FIG. 24, "Tokyo" and other cities are registered as measurement areas and IP address ranges, each corresponding to one of the measurement areas, are registered. Each time a new measurement apparatus 40 is registered in the content distribution system, information concerning the measurement apparatus 40 is added to the measurement area management table.

The communication state information will be described in detail hereinafter with reference to FIG. 25. FIG. 25 illustrates an example of a communication state management table (communication performance management table). The communication state management table corresponds to an example of communication state information and is information stored in the communication state management unit 42. In the communication state management table, information for identifying each measurement target distribution apparatus 12 (CDN), information indicating a measurement area in which each of the measurement apparatuses 40 is installed, information indicating the date of measurement, information indicating the average download time as measurement information, and information indicating the download failure rate as measurement information are associated with one another.

For example, the communication state is measured once or multiple times a day, and this measurement operation is performed every day. In a case where the communication state is measured multiple times a day, for example, the communication state is measured at preset time intervals during a day (e.g., every hour a day or every half an hour a day). The communication state may be measured at intervals of several days.

The average download time is an average of times taken for each of the measurement apparatuses 40 to acquire (download) a measurement file from each of the distribution apparatuses 12 on the corresponding date of measurement. Specifically, the average value of the download times obtained in measurements during a day is the average download time on the date of measurement. The download failure rate is the frequency with which the acquisition (download) of measurement files fails on the corresponding date of measurement. Specifically, the rate of failure in one or more measurements during a day is the download failure rate on the date of measurement. The average download time and the download failure rate are calculated by, for example, each of the measurement apparatuses 40.

The download time or the presence or absence of a download failure on each date and time of measurement may be managed without the calculation of the average download time or failure rate in measurements. In this case, in the communication state management table, information indicating the date and time of measurement, information indicating the download time, and information indicating the presence or absence of a download failure are associated with one another.

Each time the communication state is measured, information indicating the communication state is added to the communication state management table. A description will be given of the communication state between the measurement target "CDN-A" and the measurement area "Tokyo" on the measurement date "Jan. 1, 2016", for example. The average download time is "500 msec" and the download failure rate is "0".

By referring to the measurement area management table illustrated in FIG. 24, the following items are identified: the IP address range including the IP address of the area (the request source area or access source area) in which the user has submitted a request via the communication path N1 (the Internet) to acquire content, the measurement area (e.g., "Tokyo") corresponding to the IP address range, and the measurement apparatus 40 installed in the measurement area (e.g., "Tokyo"). By referring to the communication state management table illustrated in FIG. 25, the communication state (the average download time or the download failure rate) between the identified measurement area (e.g., "Tokyo") and each of the distribution apparatuses 12 (CDNs) is identified. Accordingly, the communication states between the request source area (e.g., "Tokyo") and the distribution apparatuses 12 are identified. On the basis of the communication states, the distribution apparatus selection unit 28 determines the distribution apparatus 12 in which the content to be distributed is to be stored, and stores the content to be distributed in the distribution apparatus 12. Specifically, the distribution apparatus selection unit 28 determines, as the distribution apparatus 12 in which the content to be distributed is to be stored, the distribution apparatus 12 for which the communication state with the request source area matches a specific communication state condition. Examples of the specific communication state condition include the ordinal position of the communication state (the average download time or the failure rate), and a threshold for communication states.

A process performed by the distribution apparatus selection unit 28 will be described in detail hereinafter. It is assumed here that, by way of example, the request source area is "Tokyo" and a request for acquiring content has been submitted from "Tokyo" via the communication path N1 (the Internet).

For example, the distribution apparatus selection unit 28 selects, as a candidate destination storage location(s) of the content to be distributed, one or more distribution apparatuses 12 for which the communication state is placed higher than a preset position in order from the best communication state on the date when the user submitted a request to acquire the content from among the distribution apparatuses 12A, . . . , and 12N. The ordinal position may be changed by the user, the administrator, or any other person. For example, the distribution apparatus selection unit 28 may select, as a candidate destination storage location(s) of content, one or more distribution apparatuses 12 for which the average download time is placed higher than a preset position in order from the shortest average download time on the date when the user submitted a request to acquire the content or may select, as a candidate destination storage location(s) of content, one or more distribution apparatuses 12 for which the download failure rate is placed higher than a preset position in order from the lowest download failure rate on the date when the user submitted a request to acquire the content. For instance, the user submitted a request to acquire content on "Jan. 1, 2016", and multiple distribution apparatuses 12 for which the average download time is placed higher than the second position in order from the shortest average download time are assumed to be selected as candidate destination storage locations of the content. In this case, in the example illustrated in FIG. 25, the "CDN-B" and the "CDN-C" are selected as candidate destination storage locations of the content. The distribution apparatus selection unit 28 may select, as a candidate destination storage location of the content, the distribution apparatus 12 for which the average download time is the shortest on the date when the user submitted a request to acquire the content or may select, as a candidate destination storage location of the content, the distribution apparatus 12 for which the download failure rate is the lowest on the date when the user submitted a request to acquire the content. The distribution apparatus selection unit 28 may select, as a candidate destination storage location(s) of content, one or more distribution apparatuses 12 for which the average download time is placed higher than a preset position in order from the shortest average download time on the date when the user submitted a request to acquire the content and for which the download failure rate is placed higher than a preset position in order from the lowest download failure rate on that date.

In another example, the distribution apparatus selection unit 28 may select the distribution apparatus 12 in which content to be distributed is to be stored on the basis of the average of communication states over several days including the date when the user submitted a request to acquire the content. The several days may be a preset number of days or may be a number of days set by the user or the administrator, as desired. For example, the distribution apparatus selection unit 28 may select, as a candidate destination storage location(s) of content, one or more distribution apparatuses 12 for which the average download time over several days is placed higher than a preset position in order from the shortest average download time or may select, as a candidate destination storage location(s) of content, one or more distribution apparatuses 12 for which the average download failure rate over several days is placed higher than a preset position in order from the lowest average download failure rate. The distribution apparatus selection unit 28 may select, as a candidate destination storage location of content, the distribution apparatus 12 for which the average download time over several days is the shortest or may select, as a candidate destination storage location of content, the distribution apparatus 12 for which the average download failure rate over several days is the lowest. The distribution apparatus selection unit 28 may select, as a candidate destination storage location(s) of content, one or more distribution apparatuses 12 for which the average download time over several days is placed higher than a preset position in order from the shortest average download time and for which the average download failure rate over the several days is placed higher than a preset position in order from the lowest average download failure rate.

In still another example, the distribution apparatus selection unit 28 may select, as a candidate destination storage location(s) of content, one or more distribution apparatuses 12 for which the average download time is less than or equal to a threshold time (e.g., within five seconds) on the date when the user submitted a request to acquire the content or may select, as a candidate destination storage location(s) of content, one or more distribution apparatuses 12 for which the download failure rate is less than or equal to a threshold rate (e.g., less than or equal to 5%) on the date when the user submitted a request to acquire the content. The threshold time and the threshold rate may be preset values or values that may be changed by the user, the administrator, or any other person, as desired. The distribution apparatus selection unit 28 may select, as a candidate destination storage location(s) of content, one or more distribution apparatuses 12 for which the average download time is less than or equal to a threshold time on the date when the user submitted a request to acquire the content and for which the download failure rate is less than or equal to a threshold rate on that date.

When the download time or the presence or absence of a download failure is managed for each date and time of measurement, the distribution apparatus selection unit 28 may select, as a candidate destination storage location(s) of content, one or more distribution apparatuses 12 from among the distribution apparatuses 12A, . . . , and 12N on the basis of the download time or the presence or absence of a download failure in the time slot within which the user submitted a request to acquire the content. For example, the distribution apparatus selection unit 28 may select, as a candidate destination storage location(s) of content, one or more distribution apparatuses 12 for which the download time is placed higher than a preset position in order from the shortest download time in the time slot within which the user submitted a request to acquire the content or may select, as a candidate destination storage location(s) of content, one or more distribution apparatuses 12 for which download is successful in the time slot within which the user submitted a request to acquire the content. The distribution apparatus selection unit 28 may select, as a candidate destination storage location of content, the distribution apparatus 12 for which the download time is the shortest in the time slot within which the user submitted a request to acquire the content. In another example, the distribution apparatus selection unit 28 may select, as a candidate destination storage location(s) of content, one or more distribution apparatuses 12 for which the download time is less than or equal to a threshold time in the time slot within which the user submitted a request to acquire the content.

The distribution apparatus selection unit 28 may store content to be distributed in one or more distribution apparatuses 12 selected in the way described above in accordance with the communication state or may store content to be distributed in a distribution apparatus 12 designated by the user from among the one or more distribution apparatuses 12. In another example, the distribution apparatus selection unit 28 may select the distribution apparatus 12 in which content to be distributed is to be stored from among one or more distribution apparatuses 12 selected in accordance with the communication state, on the basis of other conditions such as access restriction information or user interest information and may store the content to be distributed in the selected distribution apparatus 12.

Figure 26:
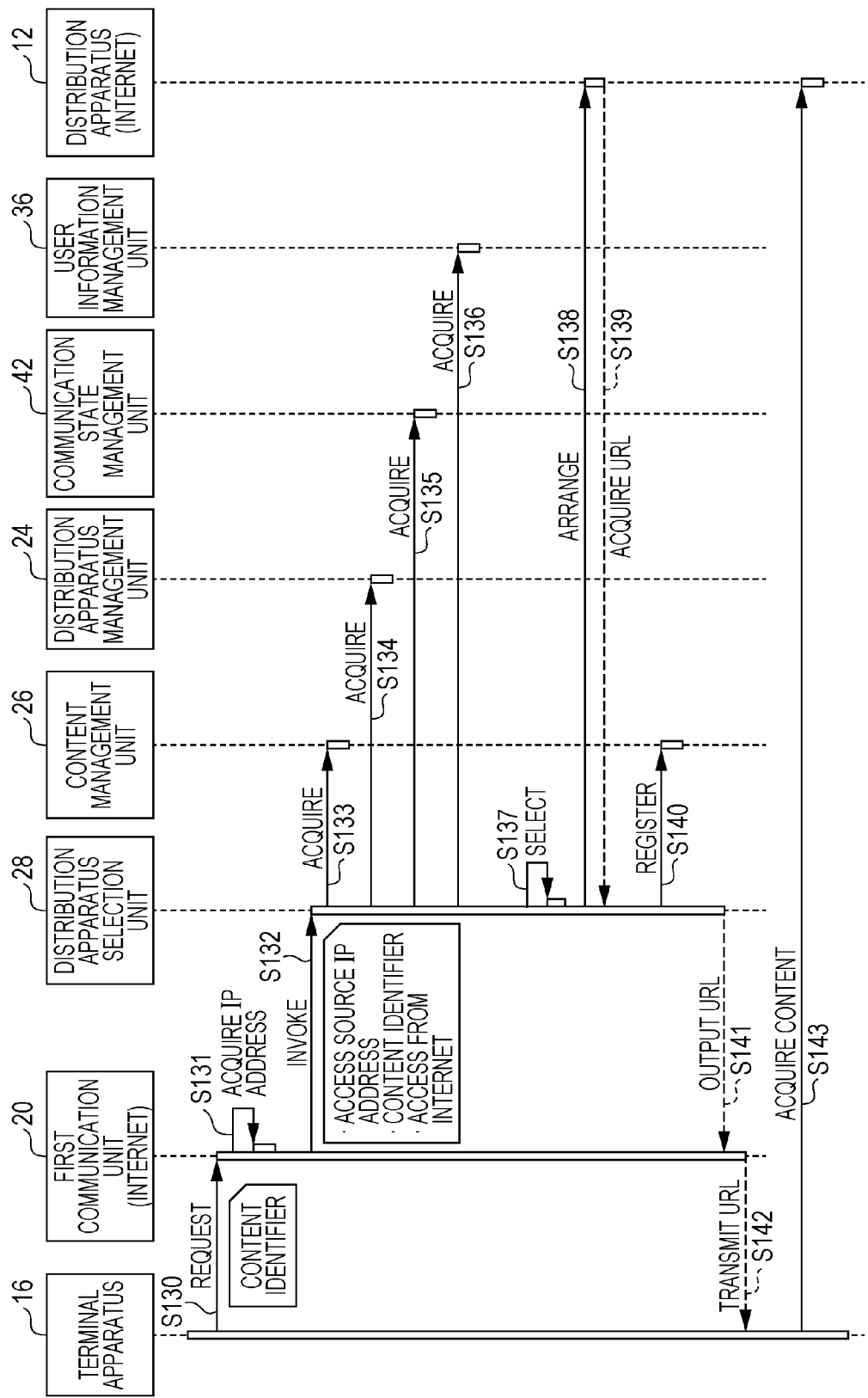
FIG. 26 is a sequence diagram illustrating a process according to the sixth exemplary embodiment.

A process performed by the content distribution system according to the sixth exemplary embodiment will be described in detail hereinafter. FIG. 26 is a sequence diagram illustrating the details of the process. It is assumed here that the content to be distributed has been registered in the distribution management apparatus 10B and has been stored in the storage unit 30. It is also assumed that a terminal apparatus 16 is used by the user at the destination distribution location.

First, the terminal apparatus 16 accesses the distribution management apparatus 10B via the communication path N1, which is the Internet, and sends to the distribution management apparatus 10B information indicating a request for acquiring content intended for distribution (S130). The information indicating the request includes the content identifier of the content to be distributed.

In the distribution management apparatus 10B, the first communication unit 20 accepts the information indicating the request. Upon acceptance of the information, the first communication unit 20 acquires the IP address of the access source or the user identifier of the user at the access source (S131). The IP address or the user identifier is acquired by using a method such as the method for SSL client authentication. Accordingly, the first communication unit 20 acquires the IP address of the terminal apparatus 16 or the user identifier of the user at the destination distribution location. In addition, the first communication unit 20 provides a process instruction to the distribution apparatus selection unit 28 (S132). That is, the function of selecting a distribution apparatus is invoked, and, subsequently, the distribution apparatus selection unit 28 performs a process. The process instruction (invocation instruction) includes the content identifier, the IP address of the terminal apparatus 16 or the user identifier of the user at the destination distribution location, and access information indicating that the terminal apparatus 16 has made access via the Internet.

The distribution apparatus selection unit 28 acquires content attribute information on the content intended for distribution from the content management table stored in the content management unit 26 by using the content identifier as a search key (S133). By referring to the content attribute information, the communication path (for Internet distribution or intranet distribution) available for the content to be distributed is identified.

The distribution apparatus selection unit 28 further acquires distribution apparatus attribute information from the distribution apparatus management table stored in the distribution apparatus management unit 24 (S134). By referring to the distribution apparatus attribute information, the communication paths (for Internet distribution or intranet distribution) supported by individual distribution apparatuses are identified.

The distribution apparatus selection unit 28 further acquires communication state information for the access source (request source area) from the communication state management unit 42 (S135). This process will be described in detail. The distribution apparatus selection unit 28 refers to the measurement area management table stored in the communication state management unit 42, thereby identifying an IP address range including the IP address of the terminal apparatus 16, identifying a measurement area corresponding to the IP address range, and identifying the measurement apparatus 40 installed in the measurement area. For example, it is assumed that the measurement area corresponding to the IP address range including the IP address of the terminal apparatus 16 is "Tokyo". In this case, the measurement apparatus 40 installed in the measurement area "Tokyo" is identified. Then, the distribution apparatus selection unit 28 acquires, from the communication state management table stored in the communication state management unit 42, information indicating the communication states (such as the average download times or the download failure rates) between the identified measurement area (e.g., "Tokyo") and the distribution apparatuses 12 (CDNs). For example, the distribution apparatus selection unit 28 acquires information indicating the communication states between the identified measurement area (e.g., "Tokyo") and the distribution apparatuses 12 on the date when the user submitted a request to acquire the content.

As in the second exemplary embodiment, furthermore, the distribution apparatus selection unit 28 may acquire access restriction information from the access restriction management table stored in the user information management unit 36 or may acquire user interest information from the user interest management table stored in the user information management unit 36 by using the user identifier of the user at the destination distribution location or the IP address of the terminal apparatus 16 as a search key (S136). By referring to the access restriction information, the domain or IP address range that the terminal apparatus 16 is allowed to access is identified. Furthermore, by referring to the user interest information, the measure on which the user at the destination distribution location places emphasis is identified. In the sixth exemplary embodiment, neither access restriction information nor user interest information may be acquired.

The distribution apparatus selection unit 28 refers to the content attribute information, the distribution apparatus attribute information, and the communication state information to select a distribution apparatus 12 suitable for the delivery of the content intended for distribution to the terminal apparatus 16 (S137). As described above, the distribution apparatus selection unit 28 selects, as the distribution apparatus 12 suitable for the distribution of the content, the distribution apparatus 12 for which the communication state with the access source (request source area) matches a specific communication state condition. As described above, for example, the distribution apparatus selection unit 28 selects one or more distribution apparatuses 12 as a distribution apparatus or apparatuses 12 suitable for the distribution of the content, on the basis of the average download time or the download failure rate or on the basis of both the average download time and the download failure rate.

If multiple distribution apparatuses 12 are selected in accordance with the communication state, the distribution apparatus selection unit 28 may select, as the distribution apparatus 12 suitable for the distribution of the content, the distribution apparatus 12 that satisfies other conditions such as access restriction information or user interest information from among the multiple distribution apparatuses 12. For example, if the user's interest is directed to high-speed communication, the distribution apparatus selection unit 28 selects, as the distribution apparatus 12 suitable for the distribution of the content, the distribution apparatus 12 for which the communication speed is the highest (the distribution apparatus 12 for which the download time is the shortest) from among the multiple distribution apparatuses 12 selected in accordance with the communication state. If the user's interest is directed to stable communication, the distribution apparatus selection unit 28 selects, as the distribution apparatus 12 suitable for the distribution of the content, the distribution apparatus 12 for which the communication is the most stable (the distribution apparatus 12 for which the download failure rate is the lowest) from among the multiple distribution apparatuses 12 selected in accordance with the communication state. Also in the sixth exemplary embodiment, the process according to any of the second to the fifth exemplary embodiments may be applied.

In the following description, it is assumed that the content intended for distribution is the "content A" and the "CDN-B" has been selected as the location (destination storage location) in which the "content A" is arranged.

If the "content A" has not been arranged (stored) in the "CDN-B" (the distribution apparatus 12), the distribution apparatus selection unit 28 sends the "content A" to the "CDN-B" to store the "content A" in the "CDN-B" (S138). Then, the distribution apparatus selection unit 28 acquires from the "CDN-B" the URL indicating the destination storage location of the "content A" on the "CDN-B" (S139). The URL is registered in the content arrangement location management table in the content management unit 26 (S140). Accordingly, the state of the arrangement of the "content A" is managed in the content arrangement location management table.

Then, the distribution apparatus selection unit 28 outputs the URL indicating the destination storage location of the "content A" (S141). The URL is transmitted to the terminal apparatus 16 by the first communication unit 20 (S142). Then, the terminal apparatus 16 accesses the "CDN-B" indicated by the URL and acquires the "content A" from the "CDN-B" (S143).

If multiple distribution apparatuses 12 are selected in accordance with the communication state, the distribution apparatus selection unit 28 may store the "content A" in all of the multiple distribution apparatuses 12 and acquire URLs from the multiple distribution apparatuses 12. In this case, multiple URLs are transmitted to the terminal apparatus 16. The user designates a specific URL from among the multiple URLs by using the terminal apparatus 16. Then, the terminal apparatus 16 accesses the URL designated by the user, thereby acquiring the "content A".

As described above, according to the sixth exemplary embodiment, if the communication state between each of the distribution apparatuses 12 and each area changes, content is stored in the distribution apparatus 12 that is more suitable for the change in communication state, compared with the case where content is stored in a constant destination storage location. For example, if the communication state changes depending on the date when the distribution apparatus 12 is accessed, content is stored in a distribution apparatus 12 for which the download time is shorter or in a distribution apparatus 12 for which the download failure rate is lower, in accordance with the change in communication state. This may allows content to be downloaded faster or may allow content to be downloaded more stably.

Seventh Exemplary Embodiment

A content distribution system according to a seventh exemplary embodiment will be described hereinafter. The content distribution system according to the seventh exemplary embodiment has the same or substantially the same configuration as that of the content distribution system according to the sixth exemplary embodiment illustrated in FIG. 20, and includes the distribution management apparatus 10B according to the sixth exemplary embodiment illustrated in FIG. 21.

In the seventh exemplary embodiment, each of the measurement apparatuses 40 measures communication states between the measurement apparatus 40 and the distribution apparatuses 12 for specific content designated as a target for which a communication state is measured. The communication states between the measurement apparatuses 40 (the respective measurement areas) and the distribution apparatuses 12 for specific content are managed by the communication state management unit 42.

When content is registered, content serving as a target for which a communication state is measured may be designated by the content provider or the administrator or may be designated automatically. After content has been registered, content serving as a target for which a communication state is measured may be designated.

Typically, for example, a user may desire to complete the download of content having a comparatively small data volume, such as a help file, immediately after a request for downloading the content has been submitted. Hence, the requirements of the user are presumably met by storing the content such as a help file in a distribution apparatus 12 for which the download time is shorter or for which the download failure rate is lower, rather than by storing the content in a distribution apparatus 12 for which the download time is longer or for which the download failure rate is higher. The content such as a help file is thus expected to be suitable as a target for which a communication state is measured.

Typically, a user may not predict that content having a comparatively large data volume, such as a system file, is completed to be downloaded immediately after a request for downloading the content has been submitted. For example, the content is expected to be downloaded at night, for example. Hence, in some cases, a user does not predict the immediate completion of downloading of such content, which is expected for a help file or the like. Therefore, the storage of content such as a system file in a distribution apparatus 12 that is not based on the communication state is not necessarily contrary to the prediction of the user.

For example, at the time of registration of the content, the content provider or the administrator determines, on the basis of the attribute of the content to be registered (such as the volume of the content or the data format of the content), whether to register the content as a target for which a communication state is measured.

In another example, the content management unit 26 may determine, on the basis of the attribute of the content to be registered, whether to register the content as a target for which a communication state is measured. For example, if the data volume of the content to be registered is greater than or equal to a threshold, the content management unit 26 may register the content as a target for which a communication state is measured, and if the data volume of the content is less than the threshold, the content management unit 26 may not register the content as a target for which a communication state is measured. If the data format of the content to be registered is a format such as that for a help file, the content management unit 26 may register the content as a target for which a communication state is measured, and if the data format of the content is a format such as that for a system file, the content management unit 26 may not register the content as a target for which a communication state is measured.

The content management unit 26 holds content attribute information and content arrangement information to manage content. The content attribute information includes, in addition to the content attribute information according to the first exemplary embodiment, information indicating whether the content is a measurement target.

The communication state management unit 42 holds measurement area management information and communication state information to manage communication states between individual measurement areas (the measurement apparatuses 40) and the distribution apparatuses 12 for specific content (content designated as a target for which a communication state is measured). That is, the communication state management unit 42 manages, for each item of specific content, the communication states between individual measurement areas and the distribution apparatuses 12.

If the content to be distributed, which has been designated by the user, is specific content designated as a target for which a communication state is measured, the distribution apparatus selection unit 28 stores the content to be distributed in the distribution apparatus 12 for which the communication state between an area (request source area) in which the user has submitted a request to acquire the content and each of the distribution apparatuses 12 matches a specific communication state condition. If the content to be distributed, which has been designated by the user, is not the specific content, as in any of the first to the fourth exemplary embodiments, the distribution apparatus selection unit 28 selects the distribution apparatus 12 in which the content to be distributed is to be stored without using the communication state, and stores the content to be distributed in the selected distribution apparatus 12. Even if the content to be distributed, which has been designated by the user, is not the specific content, the distribution apparatus selection unit 28 may select the distribution apparatus 12 in which the content to be distributed is to be stored on the basis of the communication states between the request source area and the distribution apparatuses 12 for other content or may select the distribution apparatus 12 in which the content to be distributed is to be stored on the basis of the communication states between the request source area and the distribution apparatuses 12, which have been measured by using a preset measurement file.

The content distribution system according to the seventh exemplary embodiment will be described in detail hereinafter.

FIG. 27 illustrates an example of a content management table. The content management table is an example of content attribute information and is information stored in the content management unit 26. In the content management table, a content identifier for identifying content, information indicating a communication path available for the content, information indicating whether the content is a measurement target, information indicating selection criteria, and other attribute information are associated with one another. The information indicating whether the content is a measurement target may be designated by the content provider or the administrator when, for example, the content is registered or may be designated automatically by the content management unit 26. In the example illustrated in FIG. 27, the "content B" is registered as measurement-target content. The selection criteria are criteria by which a distribution apparatus 12 is selected on the basis of the communication state. For example, the "content B" is content stored in a distribution apparatus 12 for which the download time is "within five seconds" and for which the download failure rate is "less than 0.1%". The content management table may not include information indicating selection criteria. Examples of other attribute information include information contained in the content management table illustrated in FIG. 16, namely, information indicating the conditions for Internet distribution and information indicating restrictions. The content management table may not include other attribute information. By referring to the content management table, whether the content to be distributed is content serving as a target for which a communication state is measured is determined.

FIG. 28 illustrates an example of measurement URL information. The measurement URL information is information indicating the URLs of the distribution apparatuses 12 in which measurement files are arranged (stored). Each of the measurement files is specific content designated as a target for which a communication state is measured. In the example illustrated in FIG. 28, file A, file B, and so on (content A, content B, etc.) are designated as measurement files, and URLs for acquiring the respective measurement files from the corresponding distribution apparatuses 12 are included in the measurement URL information. The measurement URL information is transmitted from the distribution management apparatus 10B to the measurement apparatuses 40 and is stored in the measurement apparatuses 40. When new content for which a communication state is measured is designated or the designation of content is canceled in the distribution management apparatus 10B, measurement URL information that reflects the designation, the cancellation of the designation, or the like is transmitted from the distribution management apparatus 10B to the measurement apparatuses 40. Accordingly, each of the measurement apparatuses 40 updates the measurement URL information.

Figure 29:
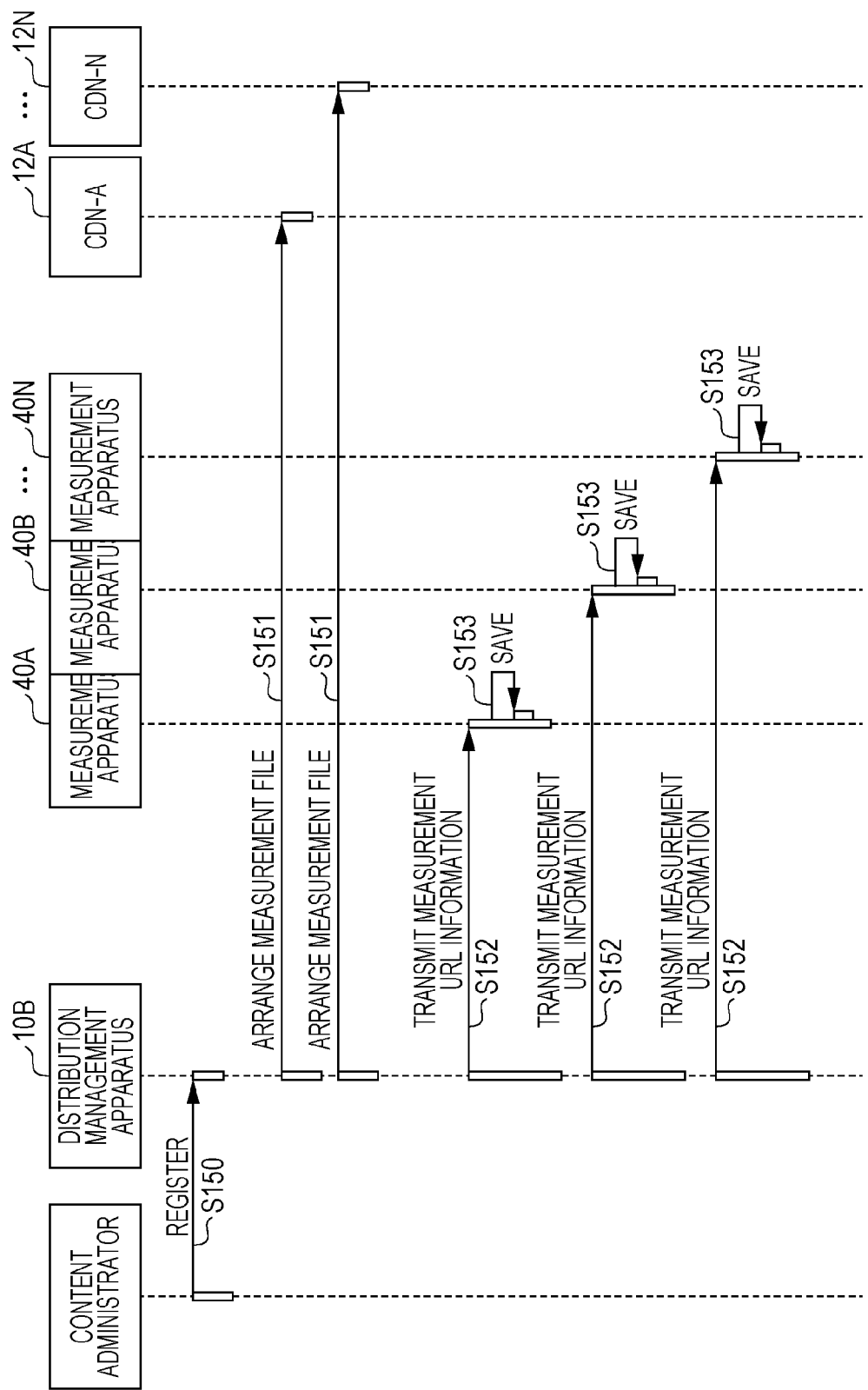
FIG. 29 is a sequence diagram illustrating an operation for storing a measurement file.

The operation of individual apparatuses for storing a measurement file will be described hereinafter with reference to FIG. 29. FIG. 29 is a sequence diagram illustrating the operation of the individual apparatuses.

The content provider or the administrator uses an apparatus such as a terminal apparatus to send content intended for distribution to the distribution management apparatus 10B to register the content (S150). The content is stored in the storage unit 30. For example, at the time of registration of the content, the content provider or the administrator specifies whether the content to be registered is registered as a target for which a communication state is measured. In another example, the content management unit 26 may specify, on the basis of the attributes of the content to be registered, whether the content is registered as a target for which a communication state is measured. If the content to be registered is designated as a target for which a communication state is measured, the designation of the content is added to the content attribute information.

If the content to be registered is designated as a target for which a communication state is measured, the content management unit 26 of the distribution management apparatus 10B arranges (stores) the content to be registered in the distribution apparatuses 12 (e.g., the CDN-A, . . . , and the CDN-N) as measurement files (S151). Further, the content management unit 26 updates measurement URL information including the URLs for acquiring the measurement files (the content designated as targets for which communication states are measured) from the distribution apparatuses 12 and transmits the updated measurement URL information to the measurement apparatuses 40 (S152). Each of the measurement apparatuses 40 receives the measurement URL information transmitted from the distribution management apparatus 10B and saves the measurement URL information (S153). The process described above is performed each time new content is registered.

Figure 30:
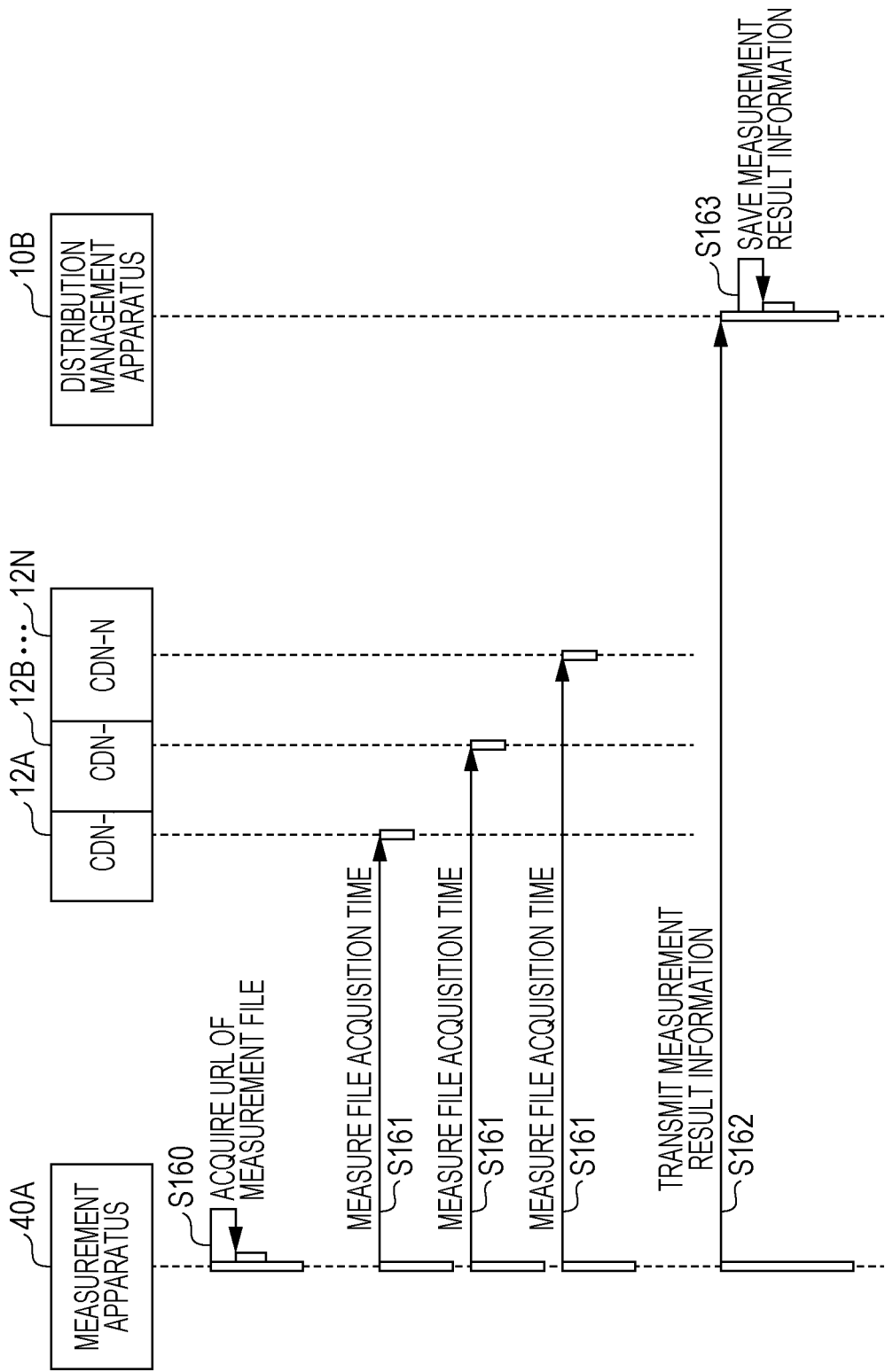
FIG. 30 is a sequence diagram illustrating an operation for measuring a communication state.

The operation of each of the measurement apparatuses 40 for measuring communication states will be described hereinafter with reference to FIG. 30. FIG. 30 is a sequence diagram illustrating the operation of each of the measurement apparatuses 40. The operation of the measurement apparatus 40A out of the measurement apparatuses 40A, . . . , and 40N will be described, by way of example.

The operations of the other measurement apparatuses 40 are the same or substantially the same as the operation of the measurement apparatus 40A.

The measurement apparatus 40A refers to the measurement URL information held therein to acquire URLs indicating the destination storage locations of the individual measurement files (specific content) (S160). Then, the measurement apparatus 40A accesses the URLs indicating the destination storage locations of the measurement files on each date or at each time, for example, to acquire the respective measurement files from the distribution apparatuses 12A, . . . , and 12N, measures, for each of the measurement files and for each of the distribution apparatuses 12, the time (download time) taken to acquire the measurement file, and detects whether a download failure has occurred (S161). Accordingly, measurement result information (information indicating the download time and information indicating the presence or absence of a download failure) is acquired for each measurement file and each of the distribution apparatuses 12. The measurement apparatus 40A transmits the measurement result information for each measurement file and each of the distribution apparatuses 12 to the distribution management apparatus 10B (S162). In the distribution management apparatus 10B, the communication state management unit 42 saves the measurement result information transmitted from the measurement apparatus 40A and updates the communication state information (communication performance information) on the basis of the measurement result information (S163). The measurement apparatuses 40 other than the measurement apparatus 40A also transmit measurement result information to the distribution management apparatus 10B. The communication state management unit 42 saves the measurement result information transmitted from the measurement apparatuses 40 and updates the communication state information on the basis of the saved measurement result information.

FIG. 31 illustrates an example of a communication state management table (performance management table). The communication state management table corresponds to an example of communication state information and is information stored in the communication state management unit 42. The communication state management table illustrated in FIG. 31 is a table indicating communication states for measurement file A (content A). In the communication state management table, as in the communication state management table illustrated in FIG. 25, information for identifying each measurement target distribution apparatus 12 (CDN), information indicating a measurement area in which each of the measurement apparatuses 40 is installed, information indicating the date of measurement, information indicating the average download time as measurement information, and information indicating the download failure rate as measurement information are associated with one another. The details of each item are the same or substantially the same as the details of the corresponding item included in the communication state management table illustrated in FIG. 25. Each time a communication state for the file A (content A) is measured, information indicating the communication state is added to the communication state management table. Communication states for a measurement file other than the file A are measured in a manner similar to those for the file A, and information indicating the communication states for this measurement file are registered in a communication state management table for this measurement file.

By referring to the content management table illustrated in FIG. 27, whether the content to be distributed, which has been requested by the user, is specific content (content designated as a target for which a communication state is measured) is determined. If the content to be distributed is the specific content, as in the sixth exemplary embodiment, by referring to the measurement area management table illustrated in FIG. 24, the following items are identified: an IP address range including the IP address of the area (request source area) in which the user has submitted a request via the communication path N1 (e.g., the Internet) to acquire the content, the measurement area (e.g., "Tokyo") corresponding to the IP address range, and the measurement apparatus 40 installed in the measurement area (e.g., "Tokyo"). Further, by referring to the communication state management table illustrated in FIG. 31, the communication state (the average download time or the download failure rate) between the identified measurement area (e.g., "Tokyo") and each of the distribution apparatuses 12 (CDNs) for the content to be distributed is identified. Accordingly, the communication states between the request source area (e.g., "Tokyo") and the distribution apparatuses 12 for the content to be distributed are identified. On the basis of the communication states, the distribution apparatus selection unit 28 determines a distribution apparatus 12 in which the content to be distributed (the content to be acquired) is to be stored, and stores the content to be distributed in the distribution apparatus 12. As in the sixth exemplary embodiment, the distribution apparatus selection unit 28 stores the content to be distributed in the distribution apparatus 12 for which the communication state with the request source area for the content to be distributed matches a specific communication state condition.

Figure 32:
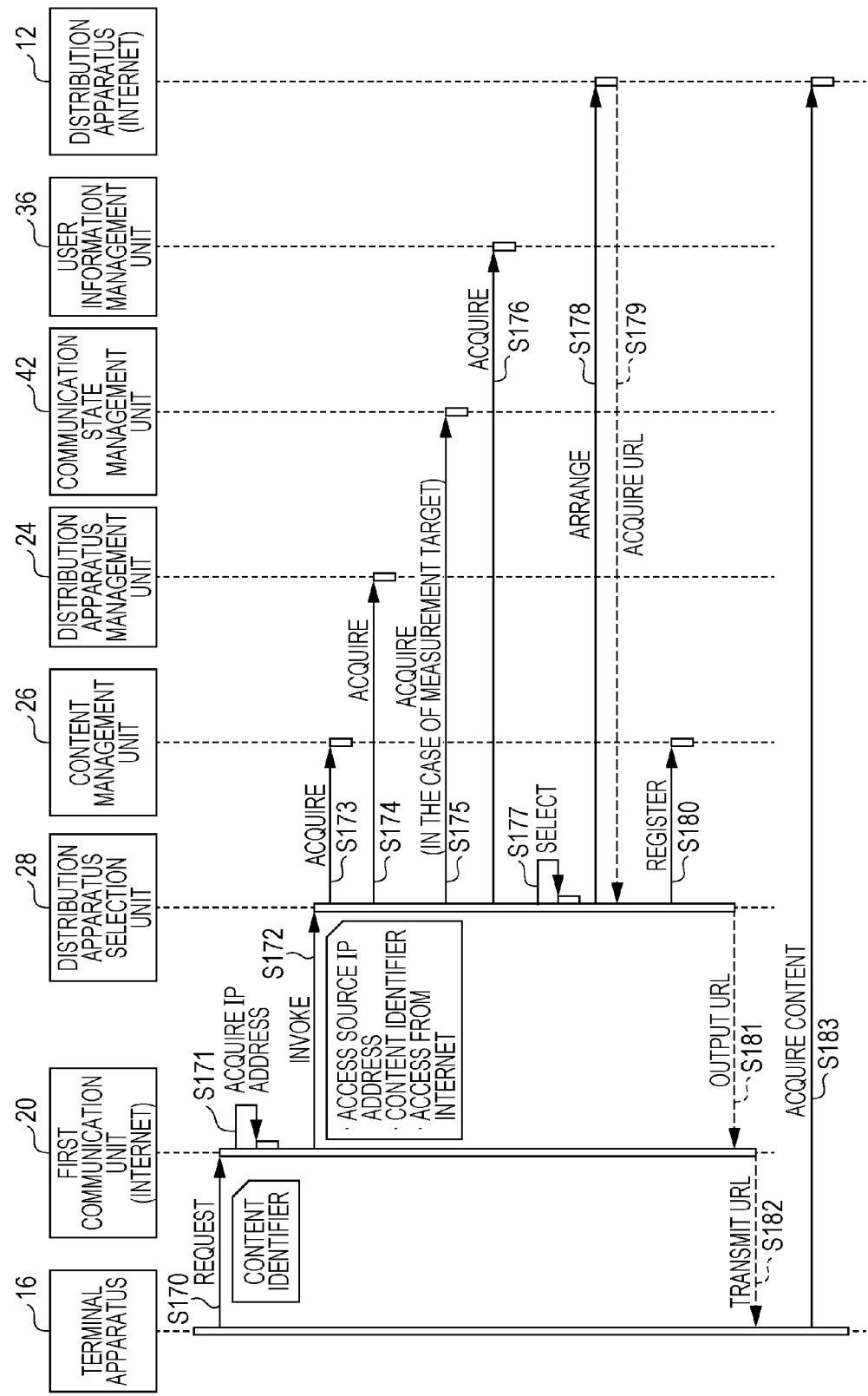
FIG. 32 is a sequence diagram illustrating a process according to a seventh exemplary embodiment.

A process performed by the content distribution system according to the seventh exemplary embodiment will be described in detail hereinafter. FIG. 32 is a sequence diagram illustrating the details of the process. It is assumed here that the content to be distributed has been registered in the distribution management apparatus 10B and has been stored in the storage unit 30. It is also assumed that a terminal apparatus 16 is used by the user at the destination distribution location.

First, the terminal apparatus 16 accesses the distribution management apparatus 10B via the communication path N1, which is the Internet, and sends to the distribution management apparatus 10B information indicating a request for acquiring content intended for distribution (S170). The information indicating the request includes the content identifier of the content to be distributed.

In the distribution management apparatus 10B, the first communication unit 20 accepts the information indicating the request. Upon acceptance of the information, the first communication unit 20 acquires the IP address of the access source or the user identifier of the user at the access source (S171). The IP address or the user identifier is acquired by using a method such as the method for SSL client authentication. Accordingly, the first communication unit 20 acquires the IP address of the terminal apparatus 16 or the user identifier of the user at the destination distribution location. In addition, the first communication unit 20 provides a process instruction to the distribution apparatus selection unit 28 (S172). That is, the function of selecting a distribution apparatus is invoked, and, subsequently, the distribution apparatus selection unit 28 performs a process. The process instruction (invocation instruction) includes the content identifier, the IP address of the terminal apparatus 16 or the user identifier of the user at the destination distribution location, and access information indicating that the terminal apparatus 16 has made access via the Internet.

The distribution apparatus selection unit 28 acquires content attribute information on the content intended for distribution from the content management table stored in the content management unit 26 by using the content identifier as a search key (S173). By referring to the content attribute information, the communication path (for Internet distribution or intranet distribution) available for the content to be distributed is identified, and whether the content to be distributed is specific content, that is, content designated as a target for which a communication state is measured, is identified.

The distribution apparatus selection unit 28 further acquires distribution apparatus attribute information from the distribution apparatus management table stored in the distribution apparatus management unit 24 (S174). By referring to the distribution apparatus attribute information, the communication paths (for Internet distribution or intranet distribution) supported by individual distribution apparatuses are identified.

If the content to be distributed, which has been requested to be acquired by the user, is specific content, that is, content designated as a target for which a communication state is measured, the distribution apparatus selection unit 28 acquires, from the communication state management unit 42, the content to be distributed and communication state information for the access source (request source area) (S175). This process will be described in detail. The distribution apparatus selection unit 28 refers to the content management table stored in the content management unit 26, thereby determining whether the content to be distributed is specific content (content designated as a target for which a communication state is measured). If the content to be distributed is the specific content, the distribution apparatus selection unit 28 refers to the measurement area management table stored in the communication state management unit 42, thereby identifying an IP address range including the IP address of the terminal apparatus 16, identifying a measurement area corresponding to the IP address range, and identifying the measurement apparatus 40 installed in the measurement area. For example, it is assumed that the measurement area corresponding to the IP address range including the IP address of the terminal apparatus 16 is "Tokyo". In this case, the measurement apparatus 40 installed in the measurement area "Tokyo" is identified. Then, the distribution apparatus selection unit 28 acquires, from the communication state management table stored in the communication state management unit 42, information indicating the communication states (such as the average download times or the download failure rates) between the identified measurement area (e.g., "Tokyo") and the distribution apparatuses 12 (CDNs) for the content to be distributed. For example, the distribution apparatus selection unit 28 acquires information indicating the communication states between the identified measurement area (e.g., "Tokyo") and the distribution apparatuses 12 for the content to be distributed on the date when the user submitted a request to acquire the content.

If the content to be distributed is not the specific content, the distribution apparatus selection unit 28 does not acquire communication state information.

As in the second exemplary embodiment, furthermore, the distribution apparatus selection unit 28 may acquire access restriction information from the access restriction management table stored in the user information management unit 36 or may acquire user interest information from the user interest management table stored in the user information management unit 36 by using the user identifier of the user at the destination distribution location or the IP address of the terminal apparatus 16 as a search key (S176). By referring to the access restriction information, the domain or IP address range that the terminal apparatus 16 is allowed to access is identified. Furthermore, by referring to the user interest information, the measure on which the user at the destination distribution location places emphasis is identified. In the seventh exemplary embodiment, neither access restriction information nor user interest information may be acquired.

If the content to be distributed is the specific content, the distribution apparatus selection unit 28 refers to the content attribute information, the distribution apparatus attribute information, and the communication state information to select a distribution apparatus 12 suitable for the delivery of the content intended for distribution to the terminal apparatus 16 (S177). As described above, the distribution apparatus selection unit 28 selects, as the distribution apparatus 12 suitable for the distribution of the content, the distribution apparatus 12 for which the communication state with the access source (request source area) matches a specific communication state condition. As described above, for example, the distribution apparatus selection unit 28 selects one or more distribution apparatuses 12 as a distribution apparatus or apparatuses 12 suitable for the distribution of the content, on the basis of the average download time or the download failure rate or on the basis of both the average download time and the download failure rate.

If multiple distribution apparatuses 12 are selected in accordance with the communication state, as in the sixth exemplary embodiment, the distribution apparatus selection unit 28 may select, as the distribution apparatus 12 suitable for the distribution of the content, the distribution apparatus 12 that satisfies other conditions such as access restriction information or user interest information from among the multiple distribution apparatuses 12. Also in the seventh exemplary embodiment, the process according to any of the second to the fifth exemplary embodiments may be applied.

If the content to be distributed is not the specific content, as in any of the first to the fourth exemplary embodiments, the distribution apparatus selection unit 28 selects the distribution apparatus 12 in which the content to be distributed is to be stored, without using the communication state information.

If the content to be distributed has not been stored in the distribution apparatus 12 selected as the destination storage location, the distribution apparatus selection unit 28 sends the content to be distributed to the distribution apparatus 12 to store the content in the distribution apparatus 12 (S178). Then, the distribution apparatus selection unit 28 acquires, from the distribution apparatus 12, the URL indicating the destination storage location of the content to be distributed on the distribution apparatus (S179). The URL is registered in the content arrangement location management table in the content management unit 26 (S180). Accordingly, the state of the arrangement of the content to be distributed is managed in the content arrangement location management table.

Then, the distribution apparatus selection unit 28 outputs the URL indicating the destination storage location of the content to be distributed (S181). The URL is transmitted to the terminal apparatus 16 by the first communication unit 20 (S182). Then, the terminal apparatus 16 accesses the distribution apparatus 12 indicated by the URL and acquires the content to be distributed from the distribution apparatus 12 (S183).

If multiple distribution apparatuses 12 are selected in accordance with the communication state, the distribution apparatus selection unit 28 may store the content to be distributed in all of the multiple distribution apparatuses 12 and acquire URLs from the multiple distribution apparatuses 12. In this case, multiple URLs are transmitted to the terminal apparatus 16. The user designates a specific URL from among the multiple URLs by using the terminal apparatus 16. Then, the terminal apparatus 16 accesses the URL designated by the user, thereby acquiring the content to be distributed.

As described above, according to the seventh exemplary embodiment, communication states are measured for each content designated as a target for which a communication state is measured, and the content to be distributed is stored in the distribution apparatus 12 on the basis of the measurement results. Accordingly, content is stored in a distribution apparatus 12 that is more suitable for the attribute of each content than that when the content to be distributed is stored in the distribution apparatus 12 on the basis of the communication states measured by using a preset measurement file (e.g., dummy data). In addition, a communication state for acquiring actual content to be distributed is measured. This enables the measurement of more accurate communication states than communication states measured by using a preset measurement file. When content is not designated as a target for which a communication state is measured (when content is expected not to be contrary to the prediction of the user for the communication state if a distribution apparatus 12 is selected without the communication state being taken into account when the content is acquired (downloaded)), a distribution apparatus 12 is selected as the destination storage location of the content without using the communication state. Thus, a distribution apparatus 12 may be selected from a wide range of distribution apparatuses 12.

The distribution management apparatuses 10, 10A, and 10B described above are each implemented by cooperation of hardware and software, by way of example. Specifically, each of the distribution management apparatuses 10, 10A, and 10B includes one or more processors such as a central processing unit (CPU) (not illustrated). The processor(s) reads and executes a program stored in a storage device (not illustrated) to implement the functions of the individual units of the distribution management apparatuses 10, 10A, and 10B. The program is stored in the storage device through a recording medium such as a compact disc (CD) or a digital versatile disc (DVD) or via a communication path such as a network. In another example, the individual units of the distribution management apparatuses 10, 10A, and 10B may be each implemented by hardware, for example, by a processor or an electronic circuit. In the implementations, a device such as a memory may be used. In another example, the individual units of the distribution management apparatuses 10, 10A, and 10B may be each implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory that stores content and information concerning communication states between a plurality of destination storage locations and a plurality of areas;
   a processor programmed to:
   acquire information on a request source area in which a user has submitted a request to acquire the content from among the plurality of areas;
   determine a destination storage location from the plurality of destination storage locations in response to receipt of the request based at least in part on a communication state between the request source area and each of the plurality of destination storage locations;
   store the content from the memory to the determined destination storage location;
   determine a change in the communication state between the request source area and the determined destination storage location;
   determine a new destination storage location from the plurality of destination storage locations in response to the determined change in the communication state, the new destination storage location being determined based at least in part on a current communication state between the request source area and each of the plurality of destination storage locations;
   store the content from the memory to the new destination storage location; and
   transmit, to the user, information for accessing the new destination storage location in which the content is stored.

2. The information processing apparatus according to claim 1, wherein the memory stores information concerning communication states between the plurality of areas and the plurality of destination storage locations for specific content designated as a target for which a communication state is measured, and
   wherein when the content requested to be acquired by the user is the specific content, the storing unit changes a destination storage location of the specific content in accordance with a communication state between the request source area and each of the plurality of destination storage locations for the specific content.

3. The information processing apparatus according to claim 1, wherein the storing unit stores the content in a destination storage location for which a communication state with the request source area satisfies a specific communication state condition.

4. The information processing apparatus according to claim 2, wherein the storing unit stores the content in a destination storage location for which a communication state with the request source area satisfies a specific communication state condition.

5. The information processing apparatus according to claim 3, wherein each of the communication states includes a time taken to acquire data at the corresponding one of the plurality of areas from the corresponding one of the plurality of destination storage locations, and
   wherein the storing unit stores the content in a destination storage location from which a time taken to acquire data at the request source area is less than or equal to a preset threshold.

6. The information processing apparatus according to claim 4, wherein each of the communication states includes a time taken to acquire data at the corresponding one of the plurality of areas from the corresponding one of the plurality of destination storage locations, and
   wherein the storing unit stores the content in a destination storage location from which a time taken to acquire data at the request source area is less than or equal to a preset threshold.

7. The information processing apparatus according to claim 3, wherein each of the communication states includes a rate of failure to acquire data at the corresponding one of the plurality of areas from the corresponding one of the plurality of destination storage locations, and
   wherein the storing unit stores the content in a destination storage location from which the rate of failure to acquire data at the request source area is less than or equal to a preset threshold.

8. The information processing apparatus according to claim 4, wherein each of the communication states includes a rate of failure to acquire data at the corresponding one of the plurality of areas from the corresponding one of the plurality of destination storage locations, and
   wherein the storing unit stores the content in a destination storage location from which the rate of failure to acquire data at the request source area is less than or equal to a preset threshold.

9. A non-transitory computer readable medium storing a program causing a computer to execute a process for information processing, the process comprising:
   storing, in a memory, content and information concerning communication states between a plurality of destination storage locations and a plurality of areas;
   acquiring information on a request source area in which a user has submitted a request to acquire the content from among the plurality of areas;
   storing the content from the memory to a destination storage location of a plurality of destination storage locations in response to receipt of the request based at least in part on a communication state between the request source area and each of the plurality of destination storage locations;
   storing the content from the memory to the determined destination storage location;
   determining a change in the communication state between the request source area and the determined destination storage location;
   determining a new destination storage location from the plurality of destination storage locations in response to the determined change in the communication state, the new destination storage location being determined based at least in part on a current communication state between the request source area and each of the plurality of destination storage locations;
   storing the content from the memory to the new destination storage location; and
   performing control to transmit, to the user, information for accessing the new destination storage location in which the content is stored.

* * * * *